(12) United States Patent
Sharma et al.

(10) Patent No.: US 11,662,378 B2
(45) Date of Patent: May 30, 2023

(54) REFERENCE LESS GLITCH DETECTION CIRCUITRY WITH AUTOCALIBRATION

(71) Applicant: XILINX, INC., San Jose, CA (US)

(72) Inventors: Sourabh Sharma, Hyderabad (IN); Sree Rama Krishna Chaithnya Saraswatula, Hyderabad (IN); Santosh Yachareni, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/401,875

(22) Filed: Aug. 13, 2021

(65) Prior Publication Data

US 2023/0049371 A1     Feb. 16, 2023

(51) Int. Cl.
*G01R 31/30* (2006.01)
*G01R 22/06* (2006.01)
*G06F 21/76* (2013.01)
*G01R 11/24* (2006.01)

(52) U.S. Cl.
CPC .......... *G01R 31/3004* (2013.01); *G01R 11/24* (2013.01); *G01R 22/066* (2013.01); *G06F 21/76* (2013.01)

(58) Field of Classification Search
CPC ...... G01R 11/24; G01R 11/25; G01R 22/066; G01R 22/068
See application file for complete search history.

(56) References Cited

U.S. PATENT DOCUMENTS

| | | | |
|---|---|---|---|
| 6,005,373 A * | 12/1999 | Snodgrass | G11C 29/56 323/266 |
| 10,466,275 B1 | 11/2019 | Vundavalli et al. | |
| 2003/0234654 A1* | 12/2003 | Sakayori | G01R 35/00 324/601 |
| 2004/0119524 A1* | 6/2004 | Tauber | G01R 35/007 327/530 |

* cited by examiner

*Primary Examiner* — Tung X Nguyen
(74) *Attorney, Agent, or Firm* — Patterson + Sheridan, LLP

(57) ABSTRACT

Detection circuitry for an integrated circuit (IC) includes voltage divider circuitry, comparison circuitry, and calibration circuitry. The voltage divider circuitry receives a power supply signal and output a first reference voltage signal and a supply voltage signal based on the power supply signal. The comparison circuitry compares the first reference voltage signal and the supply voltage signal to generate an output signal. The calibration circuitry alters one or more parameters of the voltage divider circuitry to increase a voltage value of the supply voltage signal based on the comparison of the first reference voltage signal with the supply voltage signal.

20 Claims, 12 Drawing Sheets

REFERENCE LESS GLITCH DETECTION CIRCUITRY WITH AUTOCALIBRATION

TECHNICAL FIELD

Examples of the present disclosure generally relate to detection of transient glitches on a monitored signal or supply, and, in particular, to calibrating the settings of glitch detection circuitry used in the detection of the transient glitches.

BACKGROUND

Embedded devices are used in a myriad of applications to store, transfer, and process sensitive data (e.g., passwords, personal data, intellectual property, and cryptographic keys, among others). In many instances, the embedded devices employ security mechanisms to secure the sensitive data, preventing unauthorized users from accessing the sensitive data. The embedded devices may employ security mechanisms to protect against software-oriented attacks and hardware-oriented attacks. Hardware-oriented attacks attempt to exploit vulnerabilities in the physical implementation of the embedded devices. One type of hardware-oriented attack includes introducing voltage glitches within a power supply signal in an attempt to control the operating conditions of the embedded device. To detect the hardware-oriented attacks, an embedded device includes detection circuitry to detect the voltage glitches. In many instances, the detection circuitry is manually calibrated during the design process of the embedded device. However, a manually calibrated detection circuitry has a delay period before becoming functional. This delay period may allow unauthorized users to access secure data within the embedded device before the glitch detection circuitry is active. Further, in various instances the detection circuitry is not able to properly account for process-voltage-temperature (PVT) variation, or the circuit area and design cost to account for PVT variation are high. Additionally, manually calibrated detection circuitries negatively impact the time spent during the test period, increasing the chances of user induced errors. In some instances, the detection circuitry is adjusted based on trimming bits. The trimming bits are selected based on an associated process, or bin, for the corresponding embedded device. Each bin is associated with one or more trimming bits. However, as the process of assigning an embedded device to a bin, e.g., a binning process, is not precise, trimming of the detection circuitry based on the selected trimming bits is not precise, increasing the chances of errors induced within the detection circuitry.

SUMMARY

In the following description, detection circuitry for detecting transient glitches in a power supply signal is described. The detection circuitry compares a supply voltage signal with a reference voltage signal to detect glitches. In one example, the detection circuitry includes calibration circuitry that adjusts the supply voltage signal based on a depth setting. The depth setting determines a difference between the voltage levels of the supply voltage signal and the reference voltage signal. Further, both the supply voltage signal and the reference voltage signal are generated from a common power supply signal via a resistive network, increasing the robustness of the detection circuitry when dealing with process-voltage-temperature variations (PVT). The use of the resistive network cancels out the PVT as the any difference in the ratio between the supply voltage signal and the reference voltage signal is canceled.

In one example, detection circuitry for an integrated circuit (IC) includes voltage divider circuitry, comparison circuitry, and calibration circuitry. The voltage divider circuitry is configured to receive a power supply signal and output a first reference voltage signal and a supply voltage signal based on the power supply signal. The comparison circuitry is configured to compare the first reference voltage signal and the supply voltage signal to generate an output signal. The calibration circuitry is configured to alter one or more parameters of the voltage divider circuitry to increase a voltage value of the supply voltage signal based on the comparison of the first reference voltage signal with the supply voltage signal.

In one example, an IC comprises detection circuitry. The detection circuitry comprises voltage divider circuitry, comparison circuitry, and calibration circuitry. The voltage divider circuitry is configured to receive a power supply signal and output a first reference voltage signal and a supply voltage signal based on the power supply signal. The comparison circuitry is configured to compare the first reference voltage signal and the supply voltage signal to generate an output signal. The calibration circuitry is configured to alter one or more parameters of the voltage divider circuitry to increase a voltage value of the supply voltage signal based on the comparison of the first reference voltage signal with the supply voltage signal.

In one example, a method for detecting a transient glitch within a voltage signal includes generating, via voltage divider circuitry, a first reference voltage signal and a supply voltage signal based on a power supply signal, and comparing, with comparison circuitry, the first reference voltage signal and the supply voltage signal to generate an output signal. The method further comprises altering, with calibration circuitry, one or more parameters of the voltage divider circuitry to increase a voltage value of the supply voltage signal based on the comparison of the first reference voltage signal with the supply voltage signal.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
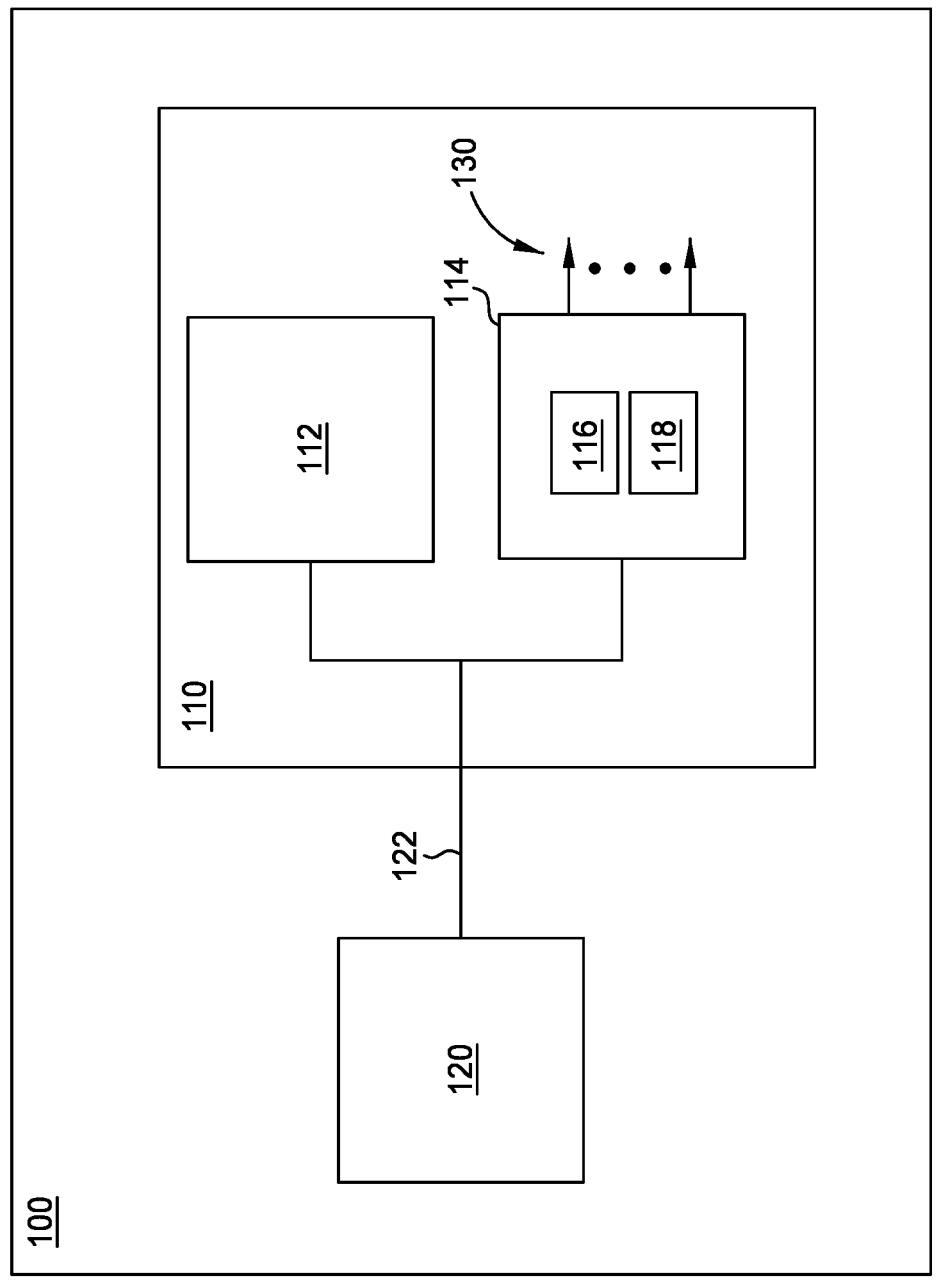
FIG. 1 illustrates a schematic block diagram of a system, according to one or more examples.

Integrated circuits (ICs) include detection circuitries that detect transient glitches within power supply signals to thwart potential unauthorized access attempts of secure data within the ICs. The detection circuitry determines if a glitch was forced into the corresponding device by an unauthorized user or a genuine glitch within the corresponding device. Unauthorized users introduce voltage glitches within a power supply signal in an attempt to control the operating conditions of an IC and access secure data. To detect potential unauthorized access attempts, the detection circuitry compares a supply voltage signal with a reference voltage signal to identify transient glitches within the power supply signal. In one example, if the voltage level of the supply voltage drops below the voltage level of the reference voltage level, a glitch may be identified. To improve the ability of the detection circuitry to detect the transient glitches, the detection circuitry includes calibration circuitry that automatically adjusts the voltage level of the supply voltage signal with reference to that of the reference voltage signal. Accordingly, the calibration circuitry of the following disclosure automatically calibrates during start up and after power-on-reset de-assertion, and/or during operation of the detection circuitry. The calibration circuitry is able to adjust the supply voltage signal accurately irrespective of any changes to the power supply voltage or operating conditions. For example, the calibration circuitry automatically adjusts the voltage level of the supply voltage signal based on operating conditions (e.g., a change in operating voltage, or a change in operating temperature, among others).

The calibration circuitry further automatically adjusts the voltage level of the supply voltage signal based on a depth setting. The depth setting determines the difference between the voltage levels of the supply voltage signal and the reference voltage signal. Further, as the calibration circuitry of the following disclosure uses matched resistor networks to generate the supply voltage signal and the reference voltage signal, both signals are maintained at an equidistance from each other regardless of any PVT variations.

As compared to detection circuitries not including calibration circuitry that performs automatic calibration, detection circuitries including calibration circuitry that perform automatic calibration are able operate without significant delay at startup of the corresponding ICs, reducing the time window available to an unauthorized user to gain access to secure data within the IC. For example, the detection circuitries may begin to operate within 15 clock cycles (e.g., about 5 μs) of startup of the corresponding IC. Further, the calibration circuitry is able to account for PVT variations of the corresponding ICs. Additionally, the calibration circuitry of the following disclosure reduces the testing time of the corresponding system as compared to other calibration circuitries, reducing user errors that may be introduced when testing resistive networks to mitigate the PVT variations.

FIG. 1 illustrates an electronic system 100 according to one or more examples. The electronic system 100 includes in integrated circuit (IC) 110 and a power supply 120. The power supply 120 is connected to the IC 110 and provides a power supply signal 122 to the IC 110. The power supply signal 122 is a voltage signal (e.g., a direct current (DC) voltage signal or alternating current (AC) voltage signal).

The IC 110 includes processing circuitry 112 and glitch monitoring circuitry 114. The processing circuitry 112 is configured to one or more of transmit data, receive data, process data, and output processed data. The processing circuitry 112 may include one or more of receiver circuitry, transmitter circuitry, and processing circuitry.

The glitch monitoring circuitry 114 monitors one or more power supply signals to detect glitches within the one or more power supply signal. The glitch monitoring circuitry 114 may monitor two or more power supply signals. In one example, the glitch monitoring circuitry 114 monitors the power supply signal 122 to detect glitches within the power supply signal 122 to mitigate unauthorized access of the IC 110 and corresponding secure data.

The glitch monitoring circuitry 114 receives the power supply signal 122 and monitors the power supply signal 122 to detect transient glitches within the power supply signal 122. The glitch monitoring circuitry 114 outputs one or more detection signals 130 based on detected glitches within the power supply signal 122.

The glitch monitoring circuitry 114 includes glitch detection circuitry 116 and sag detection circuitry 118. The glitch detection circuitry 116 and the sag detection circuitry 118 identify glitches within the power supply signal 122 and output the detection signals 130.

The IC 110 may be a field programmable gate array (FPGA) or an application specific IC (ASIC). In one example, the IC 110 includes static logic and programmable logic. The programmable logic includes circuitry that is reconfigurable. The static logic includes circuitry that remains static (e.g., unchanged) when the circuitry of the programmable logic is reconfigured. The processing circuitry 112 and the glitch monitoring circuitry 114 may include any combination of static logic and programmable logic. In one example, the glitch monitoring circuitry 114 is formed from static logic and programmable logic. Further, the glitch detection circuitry 116 and the sag detection circuitry 118 may include any combination of static logic and programmable logic. For example, the glitch detection circuitry 116 and/or the sag detection circuitry 118 are formed from static logic and/or programmable logic.

The IC 110 outputs the detection signals 130 to a controller, or other processing system, to determine whether or not to apply mitigation measures. For example, a controller may receive one or more of the detection signals 130, and process the one or more detection signals 130 to determine that the identified glitch is associated with an unauthorized access attempt. The controller provides an indication to the electronic system 100 and/or the IC 110 to restart or power down based on the determination that the identified glitch is associated with an unauthorized access attempt. The controller is part of the electronic system 100 or external to the electronic system 100.

Figure 2A:
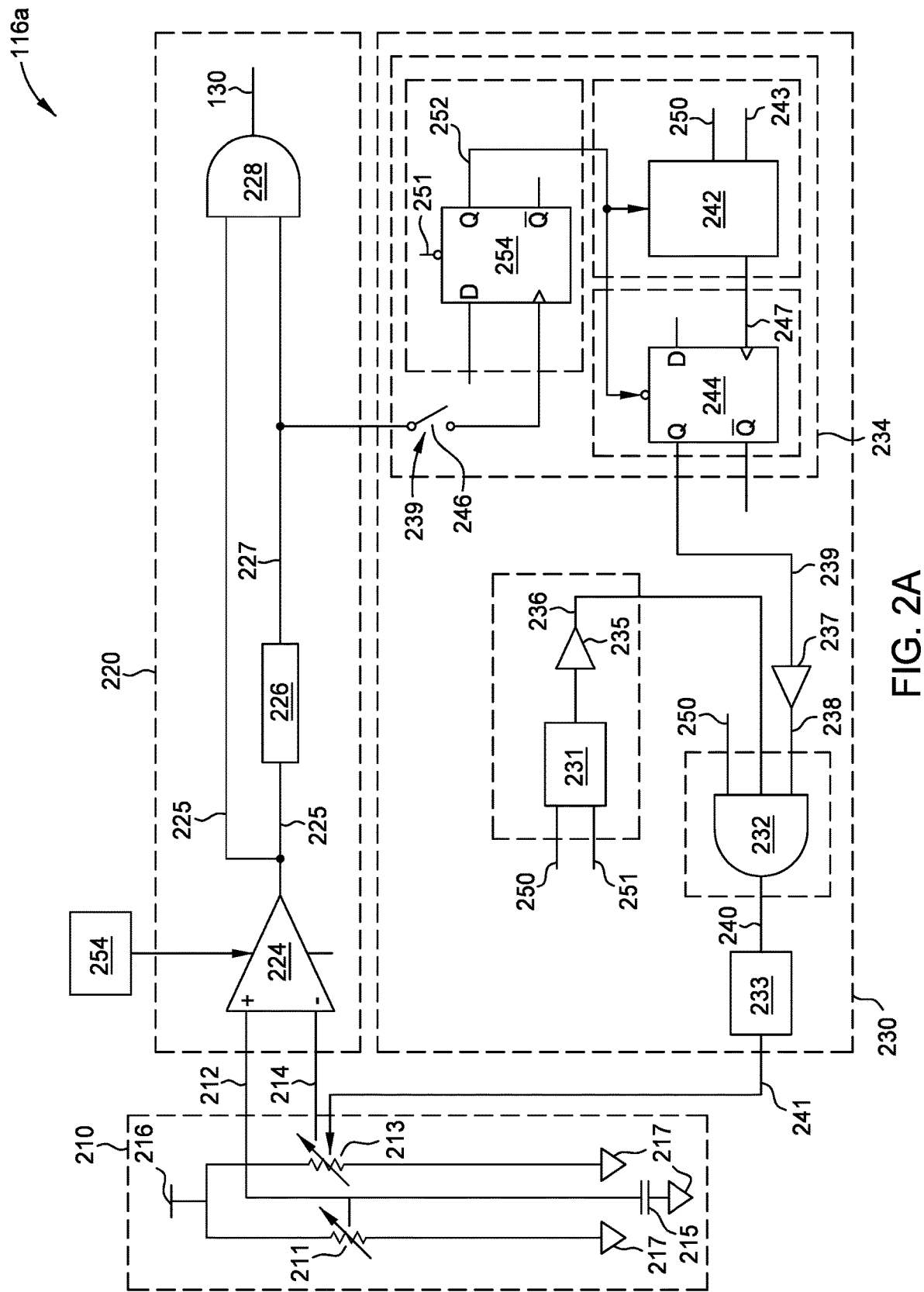
FIG. 2A illustrates a schematic diagram of detection circuitry, according to one or more examples.

FIG. 2A illustrates the glitch detection circuitry 116a, according to one or more examples. The glitch detection circuitry 116a includes voltage divider circuitry 210, comparison circuitry 220, and calibration circuitry 230. The calibration circuitry 230 auto-calibrates the glitch detection circuitry 116 at power on (e.g., startup), after reset, and/or during operation of the corresponding IC (e.g., IC 110). The glitch detection circuitry 116 is powered by a power supply 254. The power supply 254 may be a low-dropout (LDO) regulator, or another type of regulator. The power supply 254 may provide an input voltage in a range of about 0.70 V to about 1 V. In other example, the power supply 254 provides an input voltage that is less than 0.70 V or greater than 1 V. In one example, a default input voltage is about 0.85 V. In other examples, the default input voltage may be greater than or less than about 0.85 V. In one example, the glitch detection circuitry 116 detects glitches within the power supply signal 122.

A glitch may be a transient voltage corresponding to a change in a voltage level of the power supply signal 122. The transient glitch may be caused by a reduction in the voltage level of the power supply signal 122, or by the introduction of one or pulses within the power supply signal 122. In one example, a glitch corresponds is a power-based abnormality that is associated with an attempt by an unauthorized user to gain access to the electronic system 100. For example, an unauthorized user may alter a power supply signal in an attempt to gain access to the electronic system 100 to acquire secure data. The secure data may allow another to make illegitimate copies of the electronic system or IC 110. Further, the secure data may include sensitive data (e.g., passwords, personal data, intellectual property, and cryptographic keys, among others) to which access is limited.

In one example, an unauthorized user modifies the normal functionality of the power supply 120 to produce a voltage glitch on the power supply signal 122. In one example, the voltage glitch is designed to bypass power-on-reset devices within the electronic system 100. The voltage glitch may have a level below a minimum valid operating voltage of the electronic system 100 and above the power-on-reset threshold voltage of the electronic system 100. Accordingly, the power-on-reset of the electronic system 100 is not triggered. Further, the level of the voltage glitch is low enough that proper functionality of the electronic system 100 is not guaranteed. Accordingly, the unauthorized user may exploit a potentially unsecured voltage range, where the voltage level of the power supply signal 122 is above the automatic power-on-reset of the electronic system 100 and below the minimum valid operating voltage. Operating the electronic system 100 in this voltage range may allow an authorized user to tampering with, and access secure data of the electronic system 100. In one example, operating the electronic system 100 in the potentially unsecured voltage range may allow access to secure data within the IC 110.

The voltage divider circuitry 210 generates and outputs a reference voltage signal 212 and a supply voltage signal 214 based on a power supply signal 216. The power supply signal 216 is based on the power supply signal 122. In one example, the power supply signal 216 is the power supply signal 122. In another example, the power supply signal 216 is generated from the power supply signal 122. In such examples, the voltage level of the power supply signal 216 is less than the voltage level of the power supply signal 122.

The voltage divider circuitry 210 includes a variable resistance 211, a variable resistance 213, and a capacitor 215. The variable resistance 211 generates the reference voltage signal 212 from the power supply signal 216, and the variable resistance 213 generates the supply voltage signal 214 from the power supply signal 216. Stated another way, the variable resistance 211 generates the reference voltage signal 212 and the variable resistance 213 generates the supply voltage signal 214 from the same power supply signal.

The capacitor 215 is coupled between an output node of the variable resistance 211 and the voltage signal 217. The voltage signal 217 is a constant voltage signal (e.g., ground or another constant voltage within of the electronic system 100). The capacitor 215 mitigates any potential glitches on the power supply signal 216 from within the reference voltage signal 212. However, as the output node of the variable resistance 213 is not connected to a capacitor, the supply voltage signal 214 includes any glitches that occur in the power supply signal 216. Accordingly, a comparison between the reference voltage signal 212 and the supply voltage signal 214 may be used to detect glitches within the power supply signal 216.

The capacitor 215 has a capacitance value in a range of 10 pf to about 90 pf. In other embodiments, the capacitor 215 has a capacitance value less than 10 pf or greater than 90 pf.

Figure 3:
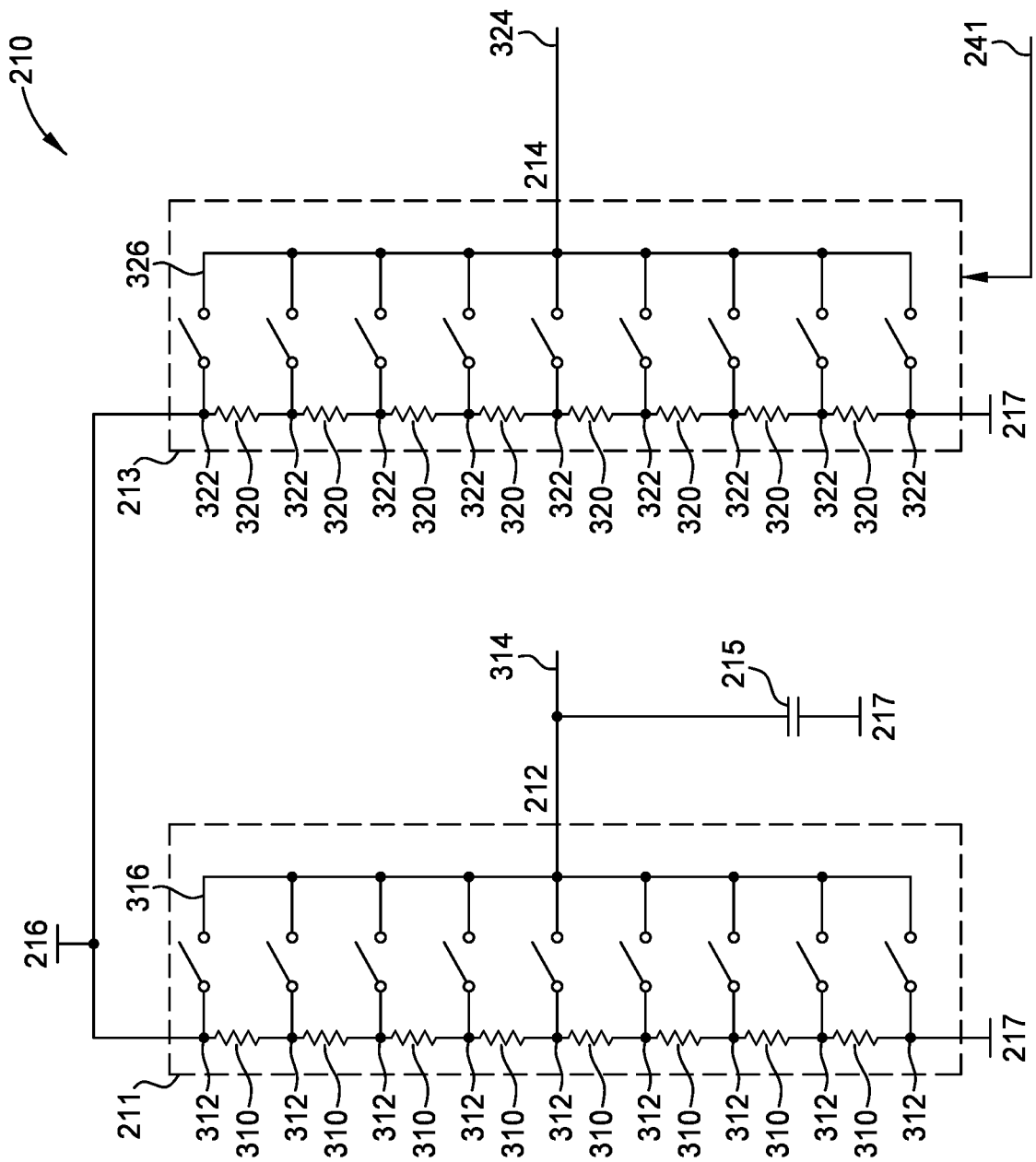
FIG. 3 illustrates voltage divider circuitry, according to one or more examples.

FIG. 3 illustrates the variable resistance 211 and the variable resistance 213, according to one or more examples. As illustrated in FIG. 3, the variable resistance 211 includes resistors 310, tap points 312, and switches 316. The variable resistance 211 includes two or more resistors 310. Further, the variable resistance 211 includes two or more tap points 312 and two or more switches 316. Each tap point 312 is associated with a different switch 316.

The resistance value of the resistors 310 is in a range of about 100 ohms to about 200 ohms. In other examples, the resistors 310 may have a resistance value of greater than 200 ohms or less than 100 ohms. The resistors 310 may each have the same resistance value, or one or more of the resistors 310 has a resistance value greater than another one or more of the resistors 310. The resistors 310 are disposed serially with each other and form a resistor string. The tap points 312 are disposed between resistors of the resistors 310, and/or between resistors and the power supply signal 216 and/or the voltage signal 217. The tap points 312 are selectively connected to the output 314 via the switches 316. Varying the tap point 312 that is connected to the output 314, varies the voltage level of the reference voltage signal 212. Connecting tap points 322 closer to the node connected to the power supply signal 216 than the node connected to the voltage signal 217 increases the voltage level of the reference voltage signal 212, as the voltage level of the power supply signal 216 is greater than that of the voltage signal 217.

In one example, the switches 316 are controlled via a control signal to determine which switch 316 is in an opened state and which is in a closed state. The control signal may be provided by an element of the electronic system 100 or the IC 110. In one example, the configuration of the switches 316 (e.g., the opened and closed state of the switches 316) is determined during a design process. In another example, the configuration of the switches 316 may be adjusted during startup and/or operation of the IC 110.

The variable resistance 213 includes two or more resistors 320. Further, the variable resistance 213 includes two or more tap points 322 and switches 326. The resistance value of the resistors 320 is in a range of about 100 ohms to about 200 ohms. In other examples, the resistors 320 may have a resistance value of less than 100 ohms or greater than 200 ohms. The resistors 320 may each have the same resistance value, or one or more of the resistors 320 has a resistance value greater than another one or more of the resistors 320.

The resistors 320 are disposed serially with each other and form a resistor string. The tap points 322 are disposed between resistors of the resistors 320, and/or between resistors and the power supply signal 216 and/or the voltage signal 217. The tap points 322 are selectively connected to the output 324 via respective ones of the switches 326, and/or between resistors and the power supply signal 216 and/or the voltage signal 217. Varying the tap point 322 that is connected to the output 314 by varying the state of the switches 326, varies the voltage level of the supply voltage signal 214.

In one example, the switches 326 are controlled via a control signal (e.g., the control signal 241) to determine which switch 326 is in an opened state and which are in a closed state. The control signal may be provided by an element of the electronic system 100 or the IC 110. In one example, control signal is the control signal 241 provided by counter circuitry 233 of the glitch detection circuitry 116. The configuration of the switches 326 (e.g., the opened and closed state of the switches 316) is adjusted based on the control signal to adjust the voltage level of the supply voltage signal 214. Connecting tap points 322 closer to the node connected to the power supply signal 216 than the node connected to the voltage signal 217 increases the voltage level of the supply voltage signal 214, as the voltage level of the power supply signal 216 is greater than that of the voltage signal 217.

The variable resistance 211 and the variable resistance 213 include the same number of the resistors 310, 320 and tap points 312, 322. In one example, one of the variable resistance 211 and the variable resistance 213 includes more resistors 310, 320 than the other. Additionally, or alternatively, one of the variable resistance 211 and the variable resistance 213 includes more tap points 312, 322 than the other. In one example, the number of tap points 322 is greater than the number tap points 312 and the number of the resistors 310 is the same as the number of the resistors 320. The resistance values of the resistors 310 may be the same as, greater than, or less than the resistance values of the resistors 320.

With further reference to FIG. 2A, the comparison circuitry 220 receives the reference voltage signal 212 and the supply voltage signal 214 from the voltage divider circuitry 210. The comparison circuitry 220 compares the reference voltage signal 212 with the supply voltage signal 214 to generate the detection signal 130 (e.g., an output signal). The detection signal 130 provides an indication as to whether or not a glitch is present within the power supply signal 216. The detection signal 130 may be provided to a controller or other processing circuitry of the electronic system 100 to determine if a glitch is present and whether or not mitigation techniques are to be applied.

The comparison circuitry 220 includes a comparator 224, a delay logic 226, and an AND gate 228. The comparator 224 compares the reference voltage signal 212 with the supply voltage signal 214 to generate comparison signal 225. The comparison signal 225 is delayed by delay logic 226 to generate delayed signal 227. The delay logic 226 delays the comparison signal 225 by one or more clock cycles. The AND gate 228 receives the comparison signal 225 and the delayed signal 227 and generates the detection signal 130. When the comparison signal 225 and the delayed signal 227 each have a high value (a logic 1), the detection signal 130 has a high value (a logic 1). When at least one of the comparison signal 225 and the delayed signal 227 has a low value (a logic 0), the detection signal 130 has a low value (a logic 0). The detection signal 130 may be observed to determine if a glitch has occurred. For example, a detection signal 130 that transitions from a high value (a logic 1) to a low value (a logic 0) and then back to the high value (a logic 1) may be indicative of a glitch as for a period of time the voltage signal of the supply voltage signal 214 is less than that of the reference voltage signal 212.

The calibration circuitry 230 is connected to the output of the delay logic 226. The calibration circuitry 230 is also connected to the voltage divider circuitry 210. The calibration circuitry 230 alters one or more of the parameters of the voltage divider circuitry 210 to increase the voltage value of the supply voltage signal 214. The calibration circuitry 230 alters the one or more parameters based on the comparison of the reference voltage signal 212 and the supply voltage signal 214. For example, the calibration circuitry 230 receives the delayed signal 227 from the output of the delay logic 226, and alters one or more of the parameters of the variable resistance 213 of the voltage divider circuitry 210 based on the delayed signal 227.

The calibration circuitry 230 includes counter circuitry 231, an AND gate 232, counter circuitry 233, and control circuitry 234. The output of the counter circuitry 231 and the output of control circuitry 234 are connected to respective inputs of the AND gate 232. The output of the AND gate 232 is connected to the counter circuitry 233. The output of the counter circuitry 233 is connected to the variable resistance 213.

The counter circuitry 231 receives a clock signal 250 and an enable signal 251. The enable signal 251 may be generated at power on (e.g., startup) of the IC 110 or the electronic system 100. In another example, the enable signal 251 is generated based on power on of the IC 110 or the electronic system 100 and the expiration of a delay. The delay may be about 5 µs. In other examples, the delay period may be about 10 µs, 15 µs, or 20 µs. In other examples, the delay may be greater than or less than about 5 µs. In one example, the delay period is 15 clock cycles of a clock signal. In other examples, the delay period is greater than or less than 15 clock cycles of a clock signal. In one example, the delay allows for an oscillator and over voltage generation devices of the power supply 120 to be ready to generate corresponding voltage signals. Further, the length of the delay period is long enough to allow the glitch monitoring circuitry 114 to reach a steady state.

The counter circuitry 231 generates a control signal that is output to a buffer 235 based on the clock signal 250 and the enable signal 251. The buffer 235 generates the control signal 236 from the control signal of the counter circuitry 231. The control signal 236 is provided to a first input of the AND gate 232. A second input of the AND gate 232 receives the clock signal 250, and a third input of the AND gate receives the control signal 238 generated by a buffer 237 connected to the output of the control circuitry 234. The buffer 237 may be an inverting buffer that inverts the control signal 239 received from the control circuitry 234.

The AND gate 232 generates a control signal 240 based on the control signals 236 and 238 and the clock signal. Based on the control signals 236 and 236 and the clock signal having a high voltage value (a logic 1), the control signal 240 has a high value (a logic 1). The control signal 240 has a low value (a logic 0) based on one or more of the control signals 236 and 236 and the clock signal having a low value (a logic 0).

The counter circuitry 233 receives the control signal 240 from the AND gate 232 and generates the control signal 241. The control signal 241 is output to the variable resistance 213 to alter the voltage level of the supply voltage signal 214 output by the variable resistance 213. For example, with reference to FIG. 3, the control signal 241 alters which of the tap points 322 is connected to the output 324 by varying the state of the switches 326. Varying the tap point 322 connected to the output 324 alters the resistance value between the selected tap point 322 and the power supply signal, and the resistance value between the selected tap point 322 and the voltage signal 217, altering the voltage level of the supply voltage signal 214. In one example, decreasing the number of the resistors 320 between the tap point 322 and the voltage signal 217, decreases the voltage level of the supply voltage signal 214. Increasing the number of the resistors 320 between the tap point 322 and the voltage signal 217, increases the voltage level of the supply voltage signal 214. In one example, the control signal 241 controls the state of the switches 326 by altering which tap point 322 is connected to the output 324, altering the voltage level of the supply voltage signal 214. For example, the control signal 241 indicates which switches to open and which switch to close.

The counter circuitry 233 is a 32 bit counter. In another example, the counter circuitry 233 is greater than or less than a 32 bit counter. The counter circuitry 233 outputs the control signal 241 to increase the voltage level of the supply voltage signal 214 based on the control signal 240 having a high level (a logic 1). The counter circuitry 233 initiates a counter, increasing the count level of the counter. Each time that the count level of the counter is increased, the control signal 241 provides an indication to the variable resistance 213 to increase the voltage level of the supply voltage signal 214. Based the control signal 240 having a low level (a logic 0), the counter circuitry 233 stops increasing the voltage level of the supply voltage signal 214, and the control signal 241 provides an indication to the variable resistance 213 to stop increasing the voltage level of the supply voltage signal 214.

In one example, based on the control signal 240 having a high level (a logic 1), the counter circuitry 233 starts counting from a counter value of 0 and continues incrementing the counter value until the control signal 240 has a low level (a logic 0). The counter circuitry 233 alters a value of the control signal 241 each time the counter value is incremented to control which of the switches 326 are in a closed state and which are in an open state. For example, each time the count value is incremented, the control signal 241 provides an indication to open the currently closed switch 326 and open the next closest switch 326 to the power supply signal 216. Accordingly, as the counter value of the counter circuitry 233 is increased, the tap points 322 closer to the node connected to the power supply signal 216 are connected to the output 324, increasing the voltage level of the supply voltage signal 214.

The control circuitry 234 generates the control signal 239 based on the comparison of the reference voltage signal 212 and the supply voltage signal 214. The control circuitry 234 includes latch circuitry 245, counter circuitry 242, latch circuitry 244, and switch circuitry 246. The latch circuitry 245 is connected to the output of the delay logic 226 via the switch circuitry 246. Further, the output of the latch circuitry 245 enables the counter circuitry 242 and latch circuitry 244. For example, the output of the latch circuitry 245 is connected to set/reset inputs of the counter circuitry 242 and the latch circuitry 244.

The clock input of the latch circuitry 245 is connected to the output of the delay logic 226 via the switch circuitry 246. The data input of the latch circuitry 245 is connected to a high voltage signal (a logic 1), and the set/reset input of the latch circuitry 245 is connected to the enable signal 251.

The switch circuitry 246 is controlled via the control signal 239 indicative as to whether or not the voltage level of the reference voltage signal 212 is greater than or less than voltage level of the supply voltage signal 214. In one example, the switch circuitry 246 is in a closed state, e.g., connects the clock input of the latch circuitry 245 with the output of the delay logic 226, based on the voltage level of the reference voltage signal 212 being greater than the voltage level of the supply voltage signal 214. The switch circuitry 246 in an opened state, e.g., disconnects the clock input of the latch circuitry 245 from the output of the delay logic 226, based on the voltage level of the reference voltage signal 212 being less than the voltage level of the supply voltage signal 214. In one example, based on the control signal 239 having a high value (a logic 1), the switch circuitry 246 is in a closed state, and based on the control signal 239 having a low value (a logic 0), the switch circuitry 246 is in an opened state.

The clock input of latch circuit 245 has a high level (a logic 1) based on the output of the comparator having a high level (a logic 1) and the switch circuitry 246 being in a closed state, and the data input having a high level (a logic 1). Accordingly, the control signal 241 has a high level (a logic 1). The control signal 252 has a low level (a logic 0) based on the switch circuitry 246 being in an opened state and the clock input having a low level (a logic 0).

The counter circuitry 242 receives the control signal 252 from the latch circuitry 245, the clock signal 250, and a control signal 243 and outputs the control signal 247. The control signal 243 may be a 2-bit bus. In other examples, the control signal 243 is greater than or less than a 2-bit bus. In one example, the counter circuitry 242 outputs the control signal 247 having a high level (a logic 1) based on the control signal 252 having a high level (a logic 1), the control signal 243 having a high level (a logic 1), or a counter value of the counter circuitry 242 being greater than 0. In one example, the control signal 243 sets a counter value of the counter circuitry 242, and based on the control signal 252 having a low level (a logic 0), the counter circuitry 242 decrements the counter value based on the clock signal 250 until the counter value is equal to a threshold value. The threshold values is greater than or equal to 0. In such an example, the counter circuitry 242 outputs the control signal 247 having a high level (a logic 1) based on the control signal 252 having a high level (a logic 1) or the counter value being greater than 0. The counter circuitry 242 outputs the control signal 247 having a high level (a logic 1) for a period after the control signal 252 transitions from a high level (a logic 1) to a low level (a logic 0).

In one example, the counter circuitry 242 is enabled by the control signal 252 and starts counting based on a corresponding depth setting. The depth setting may have a value of 00 or 11. In an example, where the depth setting is 00, the counter circuitry 242 runs for two clock cycles. In an example where the depth setting is 11, the counter circuitry 242 runs for eight clock cycles. During each clock cycle, the control signal 247 increments the latch circuitry 244 by one clock output (e.g., the control signal 239 is incremented). The incremented control signal 239 is provided to the counter circuitry 233, increasing the control signal 241 and increasing the output provided by variable resistance 213, the supply voltage signal 214.

In one example, the depth setting may be further set based on a dynamic internal trim circuit that adjusts the depth setting based on the PVT measurements after power-onreset (POR). Further, the depth setting of the counter circuitry 242 may be set during start-up and when the auto-calibration process is being performed. In another example, the depth setting of the counter circuitry 242 may be set by altering the control signal 243 during operation of the corresponding glitch detection circuitry 116a (or the glitch detection circuitry 116b of FIG. 2B) and/or electronic system. In one example, based on a change to the depth setting, glitch detection circuitry 116a (or, with reference to FIG. 2B, glitch detection circuitry 116b) is disconnected (or decoupled) from the other circuit elements in the associated electronic system, and the calibration process is repeated using the updated depth setting. Based on the completion of the calibration process, the glitch detection circuitry is reconnected to the circuit elements of the electronic system.

In one example, the control signal 243 controls the depth of the voltage level of the reference voltage signal 212 relative to that of the supply voltage signal 214. The counter circuitry 242 generates the control signal 247 having a high value (a logic 1) indicating an increase to the voltage level of the supply voltage signal 214 based on the counter value being greater than 0. In one example, the control signal 243 initializes (e.g., sets) the counter value such that the supply voltage signal 214 is about 5 percent, 10 percent, 15 percent, or 20 percent greater than that of the reference voltage signal 212. In other examples, the counter value is initialized such that the supply voltage signal 214 is greater than the reference voltage signal 212 by less than or more than about 5 percent.

The latch circuitry 244 receives the control signal 247 at a clock input of the latch circuitry 244. The data input of the latch circuitry 244 receives a high level (a logic 1). The latch circuitry 244 outputs the control signal 239 having a high level (a logic 1) based on the control signal 247 having a high level (a logic 1). Accordingly, the latch circuitry 244 outputs the control signal 239 having a high level (a logic 1) after the control signal 252 transitions to a low level (a logic 0), and as long as the control signal 247 pulses (transitions) to a high level (a logic 1) at latch circuitry 244. The control signal 239 may have a high level (a logic 1) even if the control signal 252 transitions to a low level (a logic 0) as long as the control signal 247 pulses to a high level (a logic 1). In one example, the control signal 239 having a high level (a logic 1) provides an indication to the counter circuitry 233 to alter one or more parameters of the variable resistance 213 to increase the voltage level of the supply voltage signal 214.

As is described above, the calibration circuitry 230 automatically adjusts the voltage level of the supply voltage signal 214 based on the voltage level of the supply voltage signal 214 being less than that of the of reference voltage signal 212. Further, the calibration circuitry 230 automatically adjusts the voltage level of the supply voltage signal 214 for a number of clock periods or pulses after determining that the voltage level of the supply voltage signal 214 is equal to or greater than that of the of reference voltage signal 212. The number of clock periods or pulses is based on a depth setting of the counter circuitry 242. The depth setting corresponds to a difference between the voltage levels of the supply voltage signal 214 and the reference voltage signal 212. For example, the depth setting may indicate to stop updating the voltage level of the supply voltage signal 214 when the voltage level of the of the supply voltage signal 214 is a percentage (e.g., about 5 percent, 10 percent, 15 percent, or 20 percent, or more) greater than that of the reference voltage signal 212. In one example, the calibration circuitry 230 auto-calibrates the voltage divider circuitry 210 such that the reference voltage signal 212 and the supply voltage signal 214 are equal. The calibration circuitry 230 may then auto-calibrate the voltage divider circuitry 210 to increase the voltage value of the supply voltage signal 214 relative to that of the reference voltage signal 212 based on the depth setting of the counter circuitry 242. Once the supply voltage signal 214 is calibrated, the supply voltage signal 214 and the reference voltage signal 212 may be used to detect glitches based on a comparison of the supply voltage signal 214 with the reference voltage signal 212.

Figure 2B:
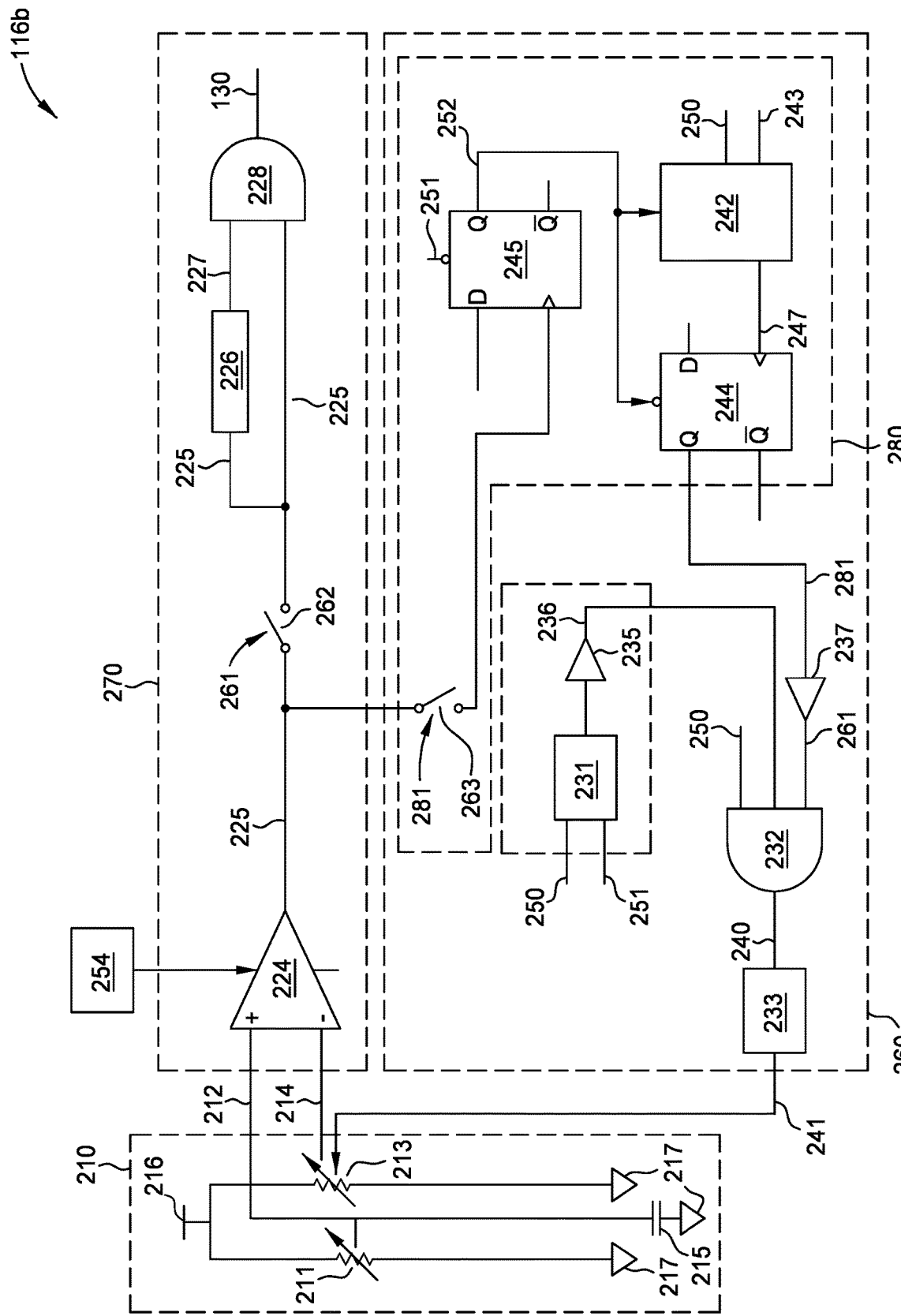
FIG. 2B illustrates a schematic diagram of detection circuitry, according to one or more examples.

FIG. 2B illustrates the glitch detection circuitry 116b, according to one or more examples. The glitch detection circuitry 116b is configured similar to that of the glitch detection circuitry 116a. For example, the glitch detection circuitry 116b includes voltage divider circuitry 210, comparison circuitry 270, and calibration circuitry 260 similar to the voltage divider circuitry 210, the comparison circuitry 220, and the calibration circuitry 230 of the glitch detection circuitry 116a. The glitch detection circuitry 116b differs from the glitch detection circuitry 116a in that the switch circuitry 262 and the switch circuitry 263 are positioned before the delay logic 226, wherein in the glitch detection circuitry 116a, the switch circuitry 246 is positioned after the delay logic 226. The above description regarding the glitch detection circuitry 116a may be applied to similar aspects the glitch detection circuitry 116b.

The comparison circuitry 270 receives the reference voltage signal 212 and the supply voltage signal 214 from the voltage divider circuitry 210. The comparison circuitry 270 compares the reference voltage signal 212 with the supply voltage signal 214 to generate the detection signal 130 (e.g., an output signal). The detection signal 130 provides an indication as to whether or not a glitch is present within the power supply signal 216. The detection signal 130 may be provided to a controller or other processing circuitry of the electronic system 100 to determine if a glitch is present and whether or not mitigation techniques are to be applied.

The comparison circuitry 270 includes a comparator 224, a delay logic 226, switch circuitry 262, and an AND gate 228. The comparison circuitry 270 is configured similar to the comparison circuitry 220. The comparison circuitry 270 includes the switch circuitry 262 positioned between the output of the comparator 224 and the delay logic 226 and the AND gate 228. The switch circuitry 262 is controlled via the control signal 261 to couple and decouple the output of the comparator 224 from the input of the delay logic 226 and the AND gate 228.

The calibration circuitry 260 is configured similar to that of the calibration circuitry 230. For example, the calibration circuitry 260 receives the output of the comparator 224 and increases or decreases the voltage of the supply voltage signal 214 based on the output of the comparator 224. The calibration circuitry 260 includes the counter circuitry 231, the AND gate 232, the buffers 235 and 237, the counter circuitry 233, and control circuitry 280. The counter circuitry 231, the AND gate 232, the counter circuitry 233, and the buffers 235 and 237 are described in greater detail with regard to FIG. 2A.

The control circuitry 280 generates the control signal 281 based on the comparison of the reference voltage signal 212 and the supply voltage signal 214. The control circuitry 280 is similar to the control circuitry 234, in that the control circuitry 280 includes the latch circuitry 245, the counter circuitry 242, and latch circuitry 244. The control circuitry 280 differs from the control circuitry 234, in that the switch circuitry 263 is located between the output of the comparator 224 and the switch circuitry 262.

The switch circuitry 262 is controlled via the control signal 261. For example, based on the control signal 261 have a logic value of 1, indicating that the calibration of the detection circuitry 116b has not yet been completed and the reference voltage signal 212 is greater in voltage value than the supply voltage signal 214, the switch circuitry 262 is in an opened state, disconnecting (decoupling) the output of the comparator 224 from the input to the delay logic 226 and the AND gate 228. Further, the control signal 261 controls the switch circuitry 262 to connect (couple) the output of the comparator 224 with the input to the delay logic 226 and the AND gate 228 based on the completion of the calibration of the glitch detection circuitry 116b, and a determination that the voltage level of the reference voltage signal 212 and the voltage level of the supply voltage signal 214 are at least equal to each other.

The switch circuitry 263 is controlled via the control signal 281. The control signal 281 is indicative as to whether or not the voltage level of the reference voltage signal 212 is greater than, equal to, or less than voltage level of the supply voltage signal 214. In one example, the switch circuitry 263 is in a closed state, e.g., connects the clock input of the latch circuitry 245 with the output of the comparator 224, based on the voltage level of the reference voltage signal 212 being greater than the voltage level of the supply voltage signal 214. The switch circuitry 263 in a closed state, e.g., disconnects the clock input of the latch circuitry 245 from the output of the comparator 224, based on the voltage level of the reference voltage signal 212 being less than or equal to the voltage level of the supply voltage signal 214. In one example, based on the control signal 281 having a high value (a logic 1), the switch circuitry 263 is in a closed state, and based on the control signal 281 having a low value (a logic 0), the switch circuitry 263 is in an opened state. The switch circuitry 263 is in a closed state when the switch circuitry 262 is an opened state, and the switch circuitry 263 is an opened state when the switch circuitry 263 is in a closed state.

The clock input of the latch circuitry 245 is connected to the output of the comparator 224 via the switch circuitry 263. The data input of the latch circuitry 245 is connected to a high voltage signal (a logic 1), and the set/reset input of the latch circuitry 245 is connected to the enable signal 251.

The clock input of latch circuit 245 has a high level (a logic 1) based on the output of the comparator 224 having a high level (a logic 1) and the switch circuitry 263 being in a closed state, and the data input having a high level (a logic 1). Accordingly, the control signal 252 has a high level (a logic 1). The control signal 252 has a low level (a logic 0) based on the switch circuitry 263 being in an opened state and the clock input having a low level (a logic 0).

The counter circuitry 242 receives the control signal 252 from the latch circuitry 245, the clock signal 250, and a control signal 243 and outputs the control signal 247. The control signal 243 may be a 2-bit bus. In other examples, the control signal 243 is greater or less than a 2 bit bus. The counter circuitry 242 is described in further detail with regard to FIG. 2A.

The latch circuitry 244 receives the control signal 247 at a clock input of the latch circuitry 244 and generates the control signal 281. The data input of the latch circuitry 244 receives a high level (a logic 1). The latch circuitry 244 outputs the control signal 281 having a high level (a logic 1) based on the control signal 247 having a high level (a logic 1). Accordingly, the latch circuitry 244 outputs the control signal 281 having a high level (a logic 1) after the control signal 252 transitions to a low level (a logic 0), and as long as the control signal 247 pulses (transitions) to a high level (a logic 1) at latch circuitry 244. The control signal 281 may have a high level (a logic 1) even if the control signal 252 transitions to a low level (a logic 0) as long as the control signal 247 pulses to a high level (a logic 1). In one example, the control signal 281 having a high level (a logic 1) provides an indication to the counter circuitry 233 to alter one or more parameters of the variable resistance 213 to increase the voltage level of the supply voltage signal 214.

As is described above with regard to the calibration circuitry 230 of FIG. 2A, the calibration circuitry 260 adjusts the voltage level of the supply voltage signal 214 based on the voltage level of the supply voltage signal 214 being less than that of the of reference voltage signal 212. Further, the calibration circuitry 260 adjusts the voltage level of the supply voltage signal 214 for a number of clock periods or pulses after determining that the voltage level of the supply voltage signal 214 is equal to or greater than that of the of reference voltage signal 212.

Figure 2C:
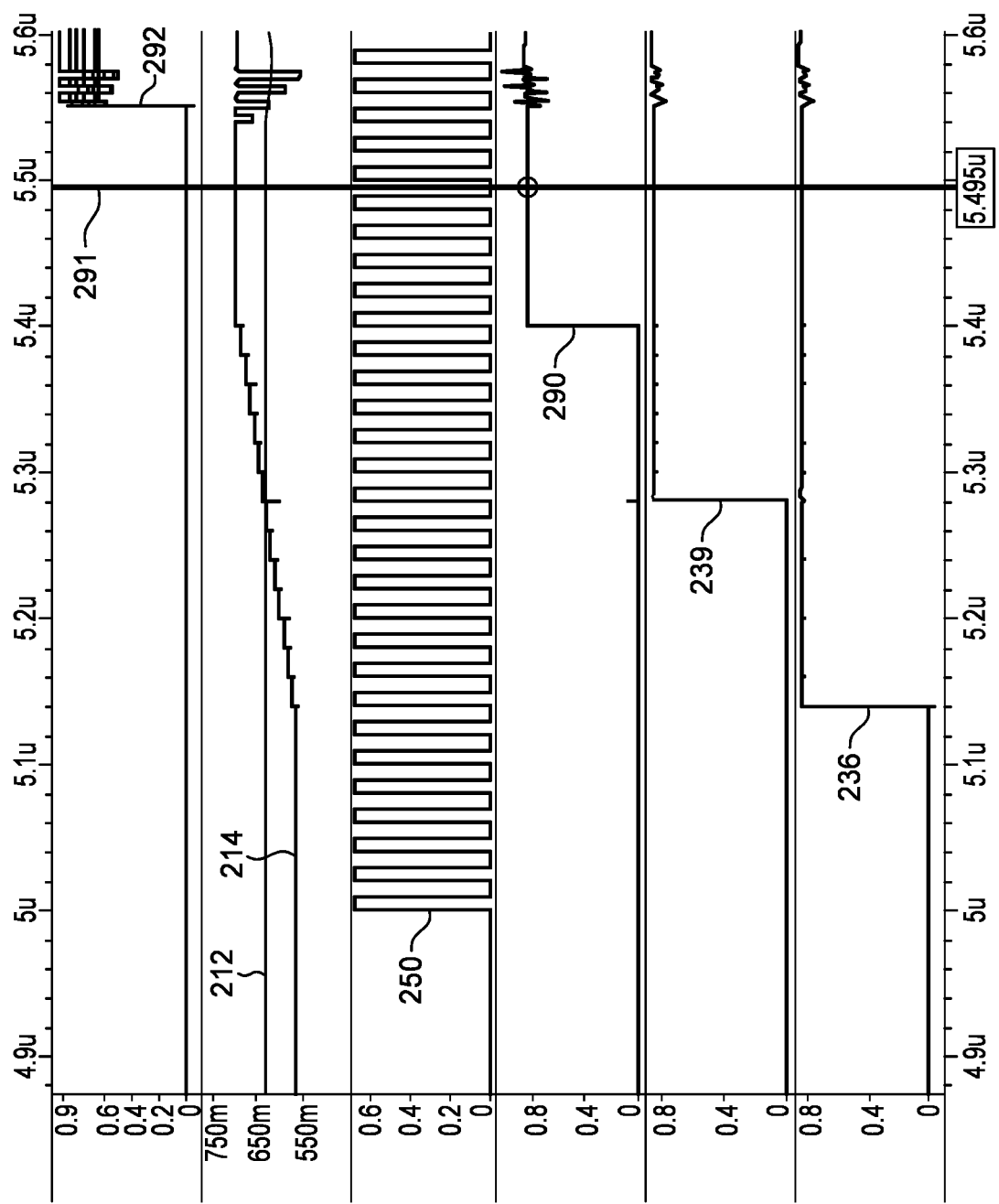
FIG. 2C illustrates waveforms of example voltage signals and control signals, according to one more examples.

FIG. 2C illustrates example waveforms of the reference voltage signal 212, the supply voltage signal 214, the clock signal 250, the control signal 236 and the control signal 239. As is illustrated by FIG. 2C, the control signal 236 transitions from a low level to high level before the control signal 239 transitions from a low level to a high level. The control signal 236 is indicative of the start of the auto-calibration process. For example, when the control signal 236 transitions to a high value, the voltage value of the supply voltage signal 214 begins to increase. When the voltage value of the supply voltage signal 214 is equal to the voltage value of the reference voltage signal 212, the control signal 239 transitions to a high value, indicating that the calibration is complete. The voltage value of the supply voltage signal 214 continues to increase until the control signal 290 transitions to a high value, indicating that the depth setting has been reached. At time 291, operation of the corresponding electronic device begins. Waveform 292 shows various unauthorized access attempts that are described in further detail with regard to FIG. 4.

The capacitor 215 of FIG. 2A and FIG. 2B mitigates large changes (e.g., glitches) in the power supply signal 216, mitigating corresponding attempts by unauthorized users to access secure data within the electronic system 100. However, the reference voltage signal 212 may experience lag based changes to the power supply signal 216. In one or more examples, by sagging (e.g., decreasing the voltage level of) the reference voltage signal 212, an unauthorized user may be able to provide glitch to the electronic system 100 and gain unauthorized access to secure data. However, the reference voltage signal 212 may be monitored to detect unauthorized access attempts. In one example, the variable resistance 211 with the capacitor 215 is a non-varying reference. An unauthorized user may induce small glitches that change the capacitive load of the variable resistance 211. Once the capacitive load is sufficiently decreased, the unauthorized user may introduce larger glitches in an attempt to disrupt the functionality of the glitch detection circuitry 116. The following description with regard to FIG. 4 describes various methods to deal with such unauthorized attempts.

Figure 4:
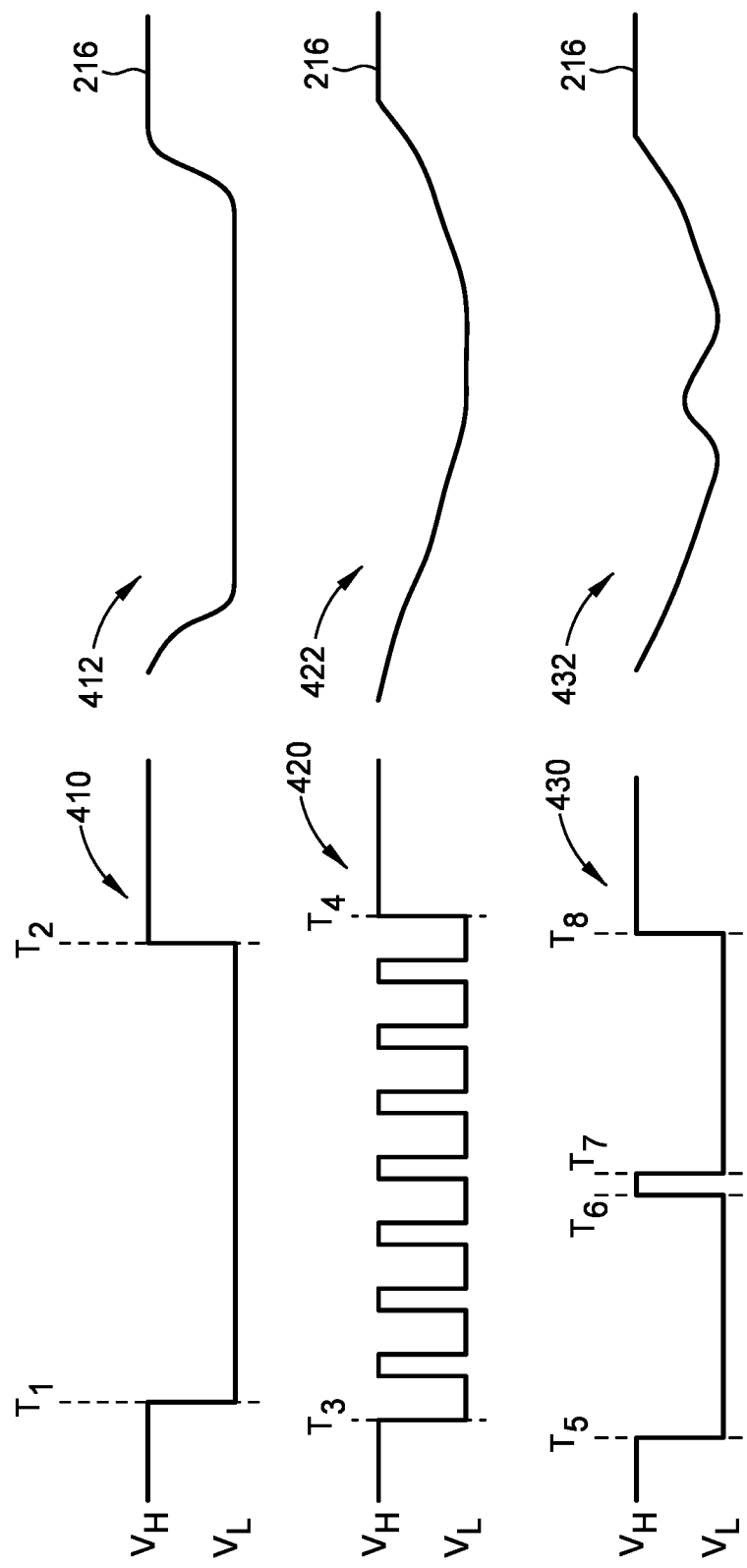
FIG. 4 illustrates waveforms of example glitches, according to one more examples.

FIG. 4 illustrates different instances where the voltage level of a power supply signal 216 is altered in an attempt to gain unauthorized access to secure data within the electronic system 100. As shown by waveform 410, the power supply signal 216 transitions from a high voltage $V_H$ to a low voltage $V_L$ at time $T_1$ and transitions from the low voltage $V_L$ to the high voltage $V_H$ at time $T_2$. Reducing the voltage value of the power supply signal 216 to $V_L$ for the period of time between $T_1$ and $T_2$ introduces a decrease in the voltage level of the reference voltage signal 212 as shown by waveform 412.

Waveform 420 includes multiple pulses between time $T_3$ and time $T_4$. The pulses transitions between high voltage $V_H$ and low voltage $V_L$. Introducing pulses within the power supply signal 216, decreases the voltage level of the reference voltage signal as shown by waveform 422.

Waveform 430 includes a pulse that occurs between time $T_5$ and time $T_8$. The pulse occurs between time $T_6$ and time $T_7$. At time $T_5$, the power supply signal 216 transitions from the high voltage $V_H$ to the low voltage $V_L$, and, at time $T_8$, the power supply signal 216 transitions from the low voltage $V_L$ to the high voltage $V_H$. Further, at time $T_6$, the power supply signal 216 transitions from the low voltage $V_L$ to the high voltage $V_H$, and, at time $T_7$, the power supply signal 216 transitions from the high voltage $V_H$ to the low voltage $V_L$. The pulse may be introduced to trick corresponding detection circuitries. Reducing the voltage level of the power supply signal 216 as indicated by waveform 430, reduces the voltage level of the reference voltage signal 212 as indicated by waveform 432.

Figure 5:
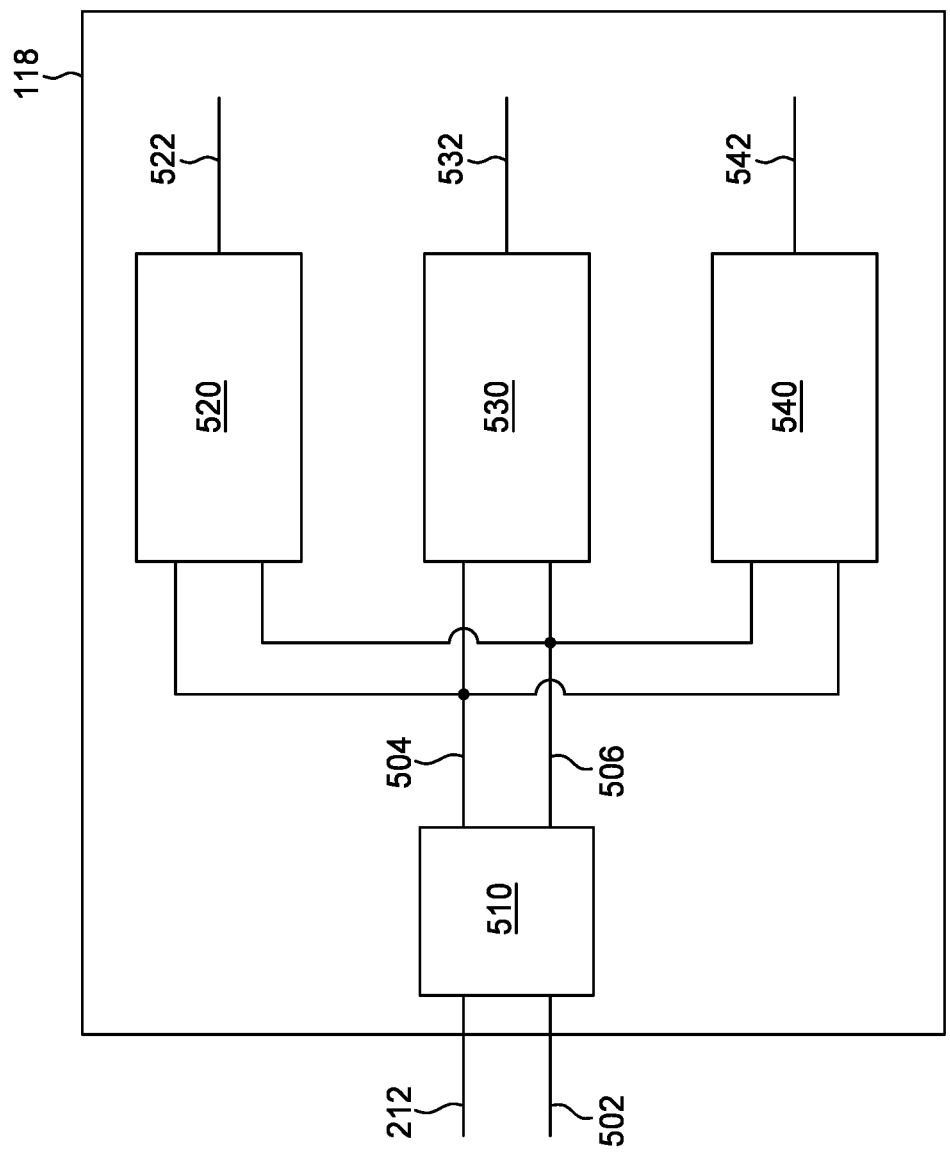
FIG. 5 illustrates a schematic block diagram of example sag detection circuitry, according to one or more examples.

Reducing the voltage level (e.g., sagging the voltage level) of the power supply signal 216 may allow for an unauthorized user to introduce a larger glitch that will not be detected, allowing the unauthorized user to gain access to secure portions within the electronic system 100. FIG. 5 illustrates sag detection circuitry 118, according to one or more examples. The sag detection circuitry 118 includes sampling circuitry 510, voltage sag detection circuitry 520, voltage sag detection circuitry 530, and voltage sag detection circuitry 540. The sampling circuitry 510 receives the reference voltage signal 212 and the voltage signal 502. The voltage signal 502 is received from the variable resistance 213 and has a voltage level greater than that of the reference voltage signal 212. In one example, the voltage level of the voltage signal 502 is one tap position higher (e.g., closer to the node connected to the power supply signal 216) than that of reference voltage signal 212.

The sampling circuitry 510 samples the reference voltage signal 212 to generate the voltage signal 504 and samples the voltage signal 502 to generate the voltage signal 506. The sampling circuitry 510 outputs the voltage signals 504 and 506 to each of the voltage sag detection circuitries 520, 530, and 540. Each of the voltage sag detection circuitries 520, 530, and 540 detects a change in the voltage level of the reference voltage signal 212 and outputs a corresponding detection signal 130 (e.g., a sag detection signal). The detection signals 130 may be provided to a controller, or other processing circuitry, to detect an unauthorized access attempt and to enact one or more mitigation measures (e.g., a reset or power down of the electronic system 100 or the IC 110) based on the detection of unauthorized access attempts.

The sag detection circuitry 520 determines a length of a pulse within the power supply signal. For example, the sag detection circuitry 520 determines a length of time between $T_1$ and $T_2$ of waveform 410. The sag detection circuitry 520 includes comparator 610, latch circuitry 612, counter circuitry 616, and count detection circuitry 618. The sag detection circuitry 520 receives the voltage signal 504 and 506 from the sampling circuitry 510. The voltage signals 504 and 506 are compared to each other by the comparator 610. The comparator 610 generates the control signal 608 to the clock input of the latch circuitry 612. The control signal 608 has a low voltage value (a logic 0) based on the value of the voltage signal 506 being less than the voltage value of the voltage signal 504. The control signal has a high voltage value (a logic 1) based on the voltage value of the voltage signal 506 being greater than the voltage value of the voltage signal 504. When the control signal 608 transitions from a high voltage level (a logic 1) to a low voltage level (a logic 0), and then from the low voltage level (a logic 0) to the high voltage level (a logic 1), the control signal 608 acts as a clock signal to the latch circuitry 612. Based on the control signal transitioning form the high voltage level (a logic 1) to the low voltage level (a logic 0), the latch circuitry 612 outputs a control signal 614 having a high voltage level (a logic 1) to the counter circuitry 616 and the count detection circuitry 618.

The counter circuitry 616 resets a count value based on receiving the control signal 614. The counter circuitry 616 outputs the control signal 620 to the preset input of the latch circuitry 612 based on the counter value being equal to 0. The counter circuitry 616 begins to decrement the counter value based on receiving the control signal 614. The counter value may be set based the length of the time period between $T_1$ and $T_2$. The length of the time period between $T_1$ and $T_2$ is associated with time periods that may be used when attempting to gain unauthorized access to the IC 110 or the electronic system 100.

The counter circuitry 616 outputs the control signal 620 after a delay based on the count value of the counter circuitry 616 being decremented to 0 (or a threshold value greater than or equal to 0). The control signal 620 resets the latch circuitry 612. Resetting the latch circuitry 612 transitions the control signal 614 from a high value (a logic 1) to a low value (a logic 0).

An enable input of the count detection circuitry 618 receives the control signal 614. The count detection circuitry 618 initiates a counter based on the control signal 614 having a high value (a logic 1). The count value is incremented until count detection circuitry 618 is disabled based on the control signal 614 having a low value (a logic 0). The count value is incremented based on the clock signal received via the clock input. The count value is compared to a threshold count value to determine if a glitch was generated within the power supply signal 216. A glitch is determined to have occurred based on the count value being greater than the threshold count value. The count detection circuitry 618 outputs the detection signal 130 based on the count value being greater than the threshold count value.

In one example, voltage sag detection circuitry 520 detects pulse inputs as indicated by waveform 410. If waveform 410 has a negative value for a long enough period of time, the voltage sag detection circuitry 520 indicates that a sag occurred. In such an example, the count value of the count detection circuitry 618 is increased until the voltage on the waveform 410 transitions from a negative value to a positive value. The count value may be increased to a predetermined value and once predetermined value is reached, a voltage sag may be detected.

Figure 7:
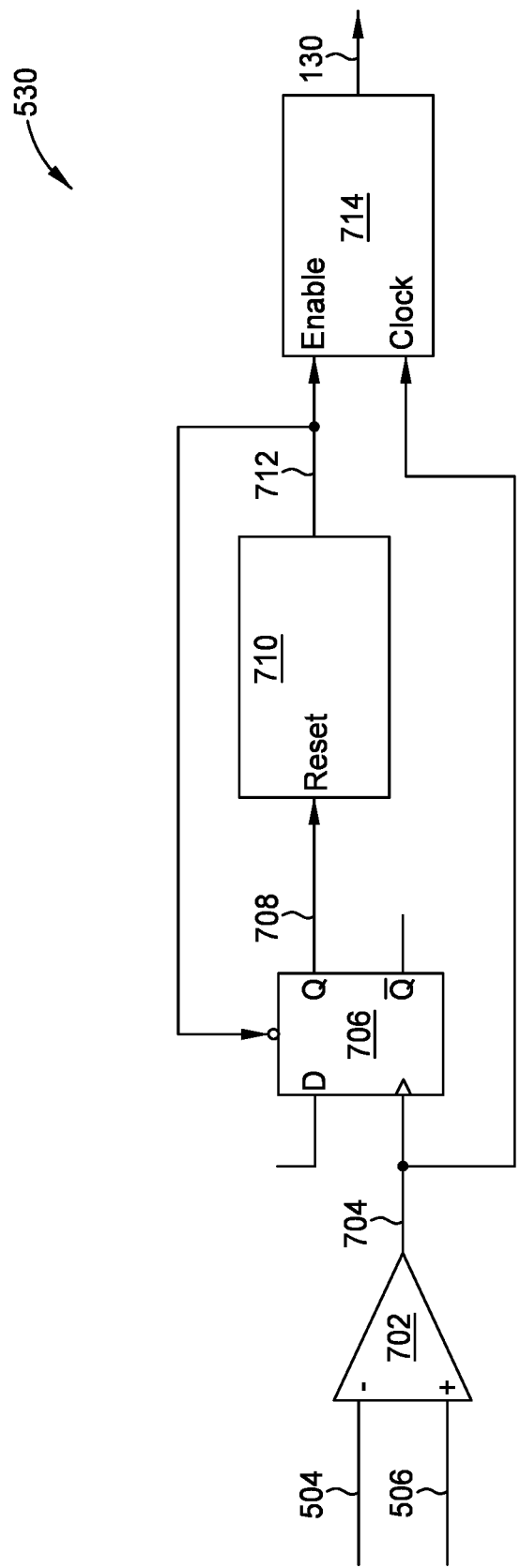
FIG. 7 illustrates a schematic diagram of sag detection circuitry, according to one or more examples.

FIG. 7 illustrates a schematic block diagram of the sag detection circuitry 530, according to one or more examples. The sag detection circuitry 530 counts a number of pulses over a period of time. The time period may be between $T_3$ and $T_4$ of FIG. 4. Based on the number of pulses satisfying a threshold value (e.g., being equal to or greater than a threshold), a glitch is detected and output via the detection signal 130.

The sag detection circuitry 530 includes latch circuitry 706, counter circuitry 710, and determination circuitry 714. The output of the comparator 702 is connected to the clock input of the latch circuitry 706 and the determination circuitry 714, the output of the latch circuitry 706 is connected to reset input of the counter circuitry 710, and the output of the counter circuitry 710 is connected to the preset input of the latch circuitry 706 and the enable input of the determination circuitry 714.

The comparator 702 generates the control signal 704 which is received at the clock input of the latch circuitry 706. The control signal 704 has a low voltage value (a logic 0) based on the value of the voltage signal 506 being less than the voltage value of the voltage signal 504. The control signal 704 has a high voltage value (a logic 1) based on the voltage value of the voltage signal 506 being greater than the voltage value of the voltage signal 504. When the control signal 704 transitions from a high voltage level (a logic 1) to a low voltage level (a logic 0), and then from the low voltage level (a logic 0) to the high voltage level (a logic 1), the control signal 704 acts as a clock signal for the latch circuitry 706 and the determination circuitry 714. Based on the control signal transitioning form the high voltage level (a logic 1) to the low voltage level (a logic 0), the latch circuitry 706 outputs a control signal 708 having a high voltage level (a logic 1) to the counter circuitry 710. The control signal 708 resets the count value of the counter circuitry 710. The counter circuitry 710 outputs the control signal 712 to the enable input of the determination circuitry 714 and to the preset input of the latch circuitry 706.

The counter circuitry 710 increments a counter value each time that the control signal 708 transitions from a low value (a logic 0) to a high level (a logic 1). In one example, the counter circuitry 710 increments a counter value within the determination circuitry 714 based on the control signal 712 having a high value (a logic 1). The determination circuitry 714 compares the count value to a threshold count value for a period of time. The determination circuitry 714 outputs the sag detection signal 532 based on the count value being greater than the threshold count value for the period of time. The period of time may be equal to the time period between $T_3$ and $T_5$ of FIG. 4. Further, the period of time is associated with a time period that may be used when attempting to gain unauthorized access to the IC 110 or the electronic system 100.

In one example, the sag detection circuitry 530 is used to detect voltage sag introduced by the waveform 420 (e.g., a pulse train). The sag detection circuitry 530 counts the number of pulses within the waveform 420 within a predetermined number of clock pulses. The number of counted pulses exceeds a threshold number pulses, a sag in the voltage of the reference supply signal is indicated.

Figure 8:
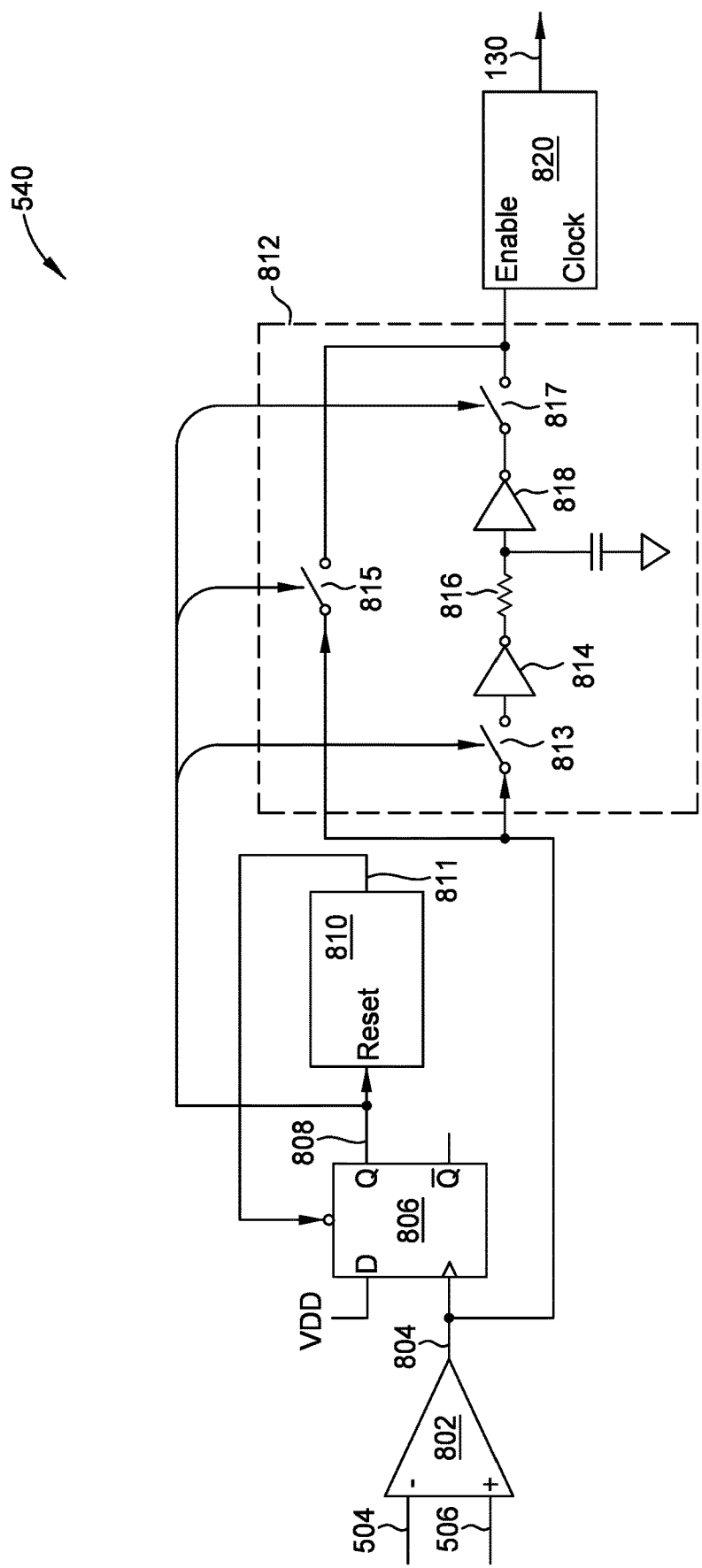
FIG. 8 illustrates a schematic diagram of sag detection circuitry, according to one or more examples.

FIG. 8 illustrates a schematic block diagram of the sag detection circuitry 540, according to one or more examples. The sag detection circuitry 540 converts a power supply signal having a pulse preceded and followed by a low voltage level to a signal having a square pulse of a longer duration than the pulse of the power supply signal and preceded and followed by a low voltage level. The power supply signal is converted based on resistor-capacitor (RC) properties of the voltage divider circuitry 210 and the sag detection circuitry 540. Generating the converted signal improves the ability for the sag detection circuitry 640 to detect a glitch within the power supply signal as compared to sag detection circuitries that do not generate the converted signal.

The sag detection circuitry 540 includes a comparator 802, latch circuitry 806, counter circuitry 810, gap detection circuitry 812, and determination circuitry 820. The output of the comparator 802 is connected to the clock input of the latch circuitry 806 and the gap detection circuitry 812, the output of the latch circuitry 806 is connected to reset input of the counter circuitry 810 and the gap detection circuitry 812, and the output of the counter circuitry 810 is connected to the preset input of the latch circuitry 806.

The comparator 802 generates the control signal 804 based on the voltage signals 504 and 506. The control signal 804 is received at the clock input of the latch circuitry 806. Further, the control signal 804 is received at the switch circuitries 813, 815, and 817. The control signal 804 has a low voltage value (a logic 0) based on the value of the voltage signal 506 being less than the voltage value of the voltage signal 504. The control signal 804 has a high voltage value (a logic 1) based on the voltage value of the voltage signal 506 being greater than the voltage value of the voltage signal 504. The control signal 804 is provided as an input to the gap detection circuitry 812. Based on the control signal 804 transitioning form the high voltage level (a logic 1) to the low voltage level (a logic 0), the latch circuitry 806 outputs a control signal 808 having a high voltage level (a logic 1) to the counter circuitry 810, and to the switch circuitries 813, 815, and 817. The control signal 808 resets the count value of the counter circuitry 810.

The counter circuitry 810 outputs the control signal 811 to the preset input of the latch circuitry 806 based on a count value of the counter circuitry 810 being equal to 0. The counter circuitry 810 decrements the count value based on receiving the control signal 808. The count value is based on the time period between $T_5$ and $T_8$ of FIG. 4. In one example, the count value is based on a time period associated with when an unauthorized user may attempt to access the IC 110 or the electronic system 100.

The control signal 808 further controls the state of the switch circuitries 813, 815, and 817. For example, based on the control signal 808 having a high value (a logic 1), the switch circuitries 813 and 817 are placed in a closed state and the switch circuitry 815 is placed in an open state. Based on the control signal 808 having a low value (a logic 0), the switch circuitries 813 and 817 are placed in an opened state and the switch circuitry 815 is placed in a closed state. When the switch circuitries 813 and 817 are in a closed state, the control signal 804 is received at the enable input of the determination circuitry 820 via the inverter 814, the resistor 816, and the inverter 818. When the switch circuitries 813 and 817 are in an opened state, and the switch circuitry 815 is placed in a closed state, the gap detection circuitry 812 is connected to the enable input of the determination circuitry 820. The determination circuitry 820 measures the amount of time between the control signal 804 transitioning from a high voltage (logic 1) to a low voltage (logic 0) and from a low voltage (logic 0) to a high voltage (logic 1). The determination circuitry 820 compares the amount of time to a threshold value. The determination circuitry 820 outputs the detection signal 130 indicating that a sag event was detected based on the amount of time being greater than the threshold value. The threshold value is indicative of an amount of time an unauthorized user may produce sag within the power supply signal 216 to gain access to the electronic system 100 or the IC 110. In one example, the period of time corresponds to a period between $T_5$ and $T_8$ of FIG. 4. In one sag detection circuitry 540 detects sag as indicated by the waveform 430. Voltage sag generated by the waveform 430 is an intermediate case between sag generated by the waveform 410 and the waveform 420.

Figure 9:
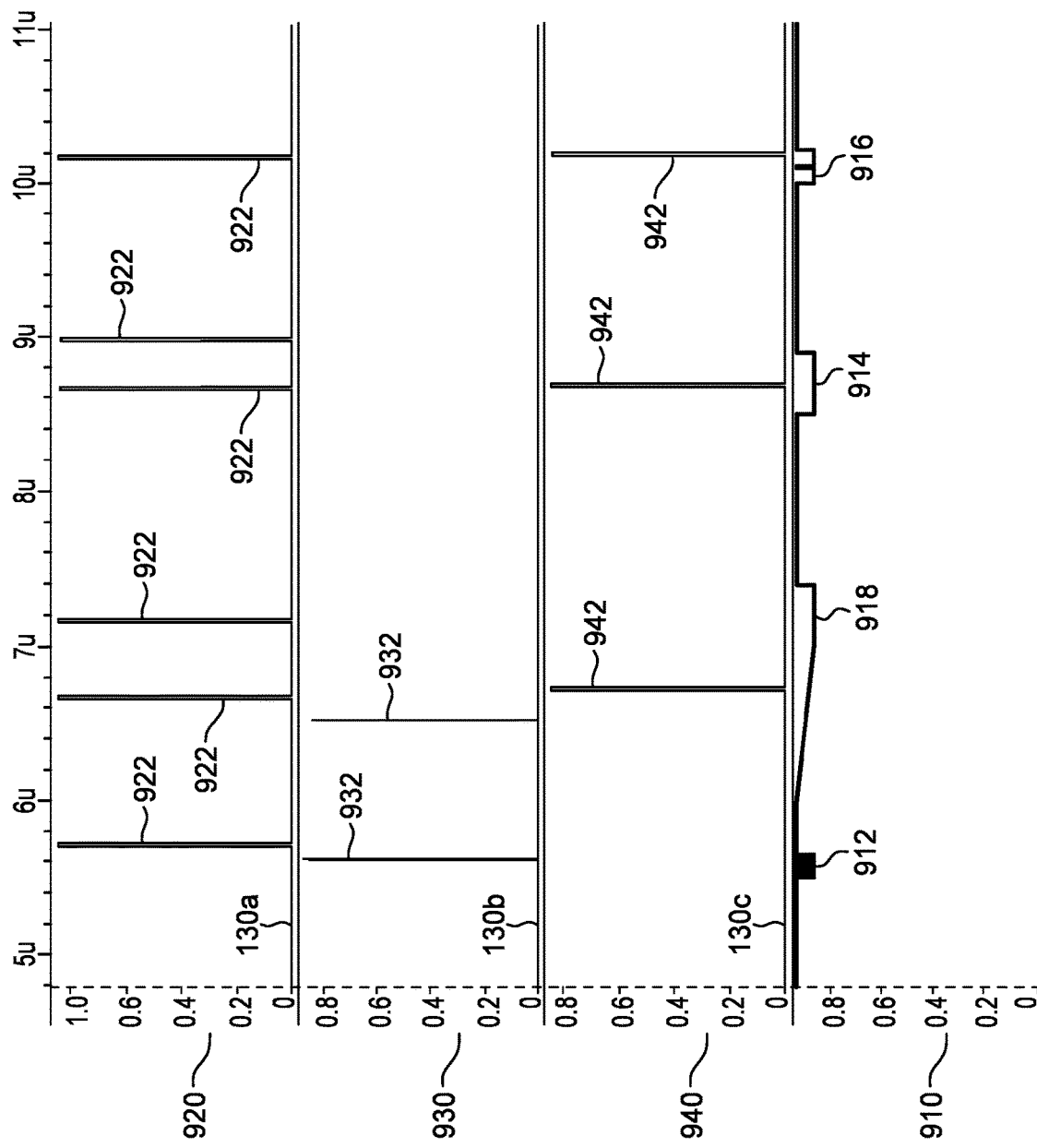
FIG. 9 illustrates waveforms associated with the detection of unauthorized access attempts, according to one or more examples.

FIG. 9 illustrates example voltage waveforms 900, according to one or more examples. The voltage waveform 910 illustrates one or more glitches (e.g., unauthorized access attempts). As illustrated, the voltage waveform 910 indicates glitches 912, 914, 916, and 918. Glitch 912 corresponds to voltage waveform 420 of FIG. 4. For example, during glitch 912, one or more voltage pulses are introduced on the reference voltage. Glitch 914 corresponds to waveform 410 of FIG. 4. For example, during glitch 912, the reference voltage is transitioned to a low voltage for a period of time as illustrated by the waveform 410 of FIG. 4. Glitch 916 corresponds to waveform 430 of FIG. 4. For example, during glitch 916, the reference voltage is transitioned to a low voltage for a period of time, followed by a voltage pulse, and another transition to the low voltage as illustrated by the waveform 430 of FIG. 4.

Figure 6:
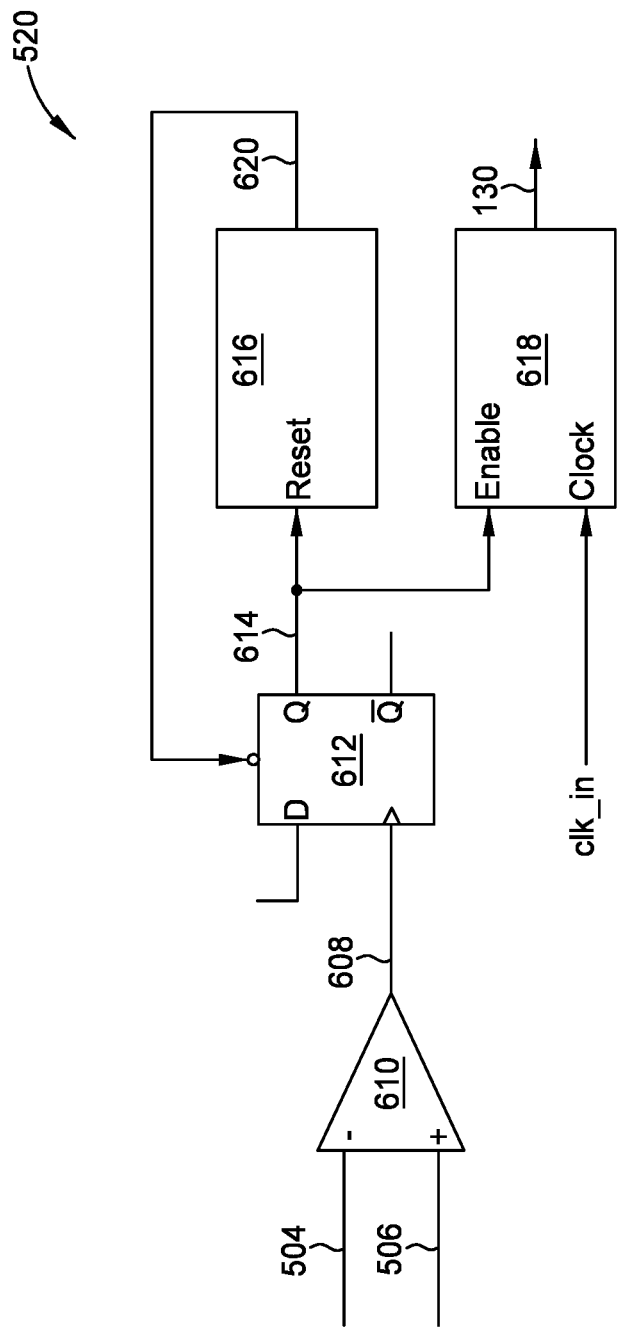
FIG. 6 illustrates a schematic diagram of sag detection circuitry, according to one or more examples.

Graph 920 illustrates a detection signal 130a with sag detections 922. In one example, the voltage sag detection circuitry 520 generates the detection signal 130a with sag detections 922 based on one or more of the glitches 912-918. For example, based a detection of each of the glitches 912-918, the voltage sag detection circuitry 520 provides an indication of sag detection via a corresponding one of the sag detections 922. The detection process performed by the voltage sag detection circuitry 520 is described above with regard to FIG. 6.

Graph 930 illustrates a detection signal 130b with sag detections 932. In one example, the voltage sag detection circuitry 530 generates the detection signal 130b with sag detections 932 based on the glitches 912-918. For example, based a detection of each of the glitches 912 and 918, the voltage sag detection circuitry 530 provides an indication of sag detection via a corresponding one of the sag detections 932. The detection process performed by the voltage sag detection circuitry 530 is described above with regard to FIG. 7.

Graph 940 illustrates a detection signal 130c with sag detections 942. In one example, the voltage sag detection circuitry 540 generates the detection signal 130c with sag detections 942 based on the glitches 912-918. For example, based a detection of each of the glitches 914-918, the voltage sag detection circuitry 540 provides an indication of sag detection via a corresponding one of the sag detections 942. The detection process performed by the voltage sag detection circuitry 540 is described above with regard to FIG. 8.

As illustrated by the graph 920, the detection circuitry 520 detects each of the glitches 912-918. Further, as compared to the detection circuitries 530 and 540, the detection circuitry 520 indicates more glitches than that occurred in the voltage signal of voltage waveform 910. Accordingly, the detection signal 130a may be include one or more false detections of glitches. As illustrated by the graph 930, the detection circuitry 530 detects the glitches 912 and 918, and does not detect the glitches 914 and 916. Further, as illustrated by the graph 940, the detection circuitry 540 detects the glitches 914-916. The detection signals 130b and 130c include less false detections of glitches than the detection signal 130a. In one or more examples, the detection signals 130a-130c may be compared to each other to detect the presence of a glitch in the reference voltage signal. For example, comparing the detections signal 130a with the detection signals 130b and 130c may be used to determine which of the glitch detections 922 are true glitches (correct detection) are and which are false detections. In one example, based on a glitch detection being present in the detection signals 130a and 130b, the glitch detection is determined to be a correct detection. Further, based on a glitch detection being present in the detection signals 130a and 130c, the glitch detection is determined to be a correct detection. Further, based on a glitch detection being present in the detection signal 130a but not in the detection signals 130b or 130c, the glitch detection is determined to be a false detection.

Figure 10:
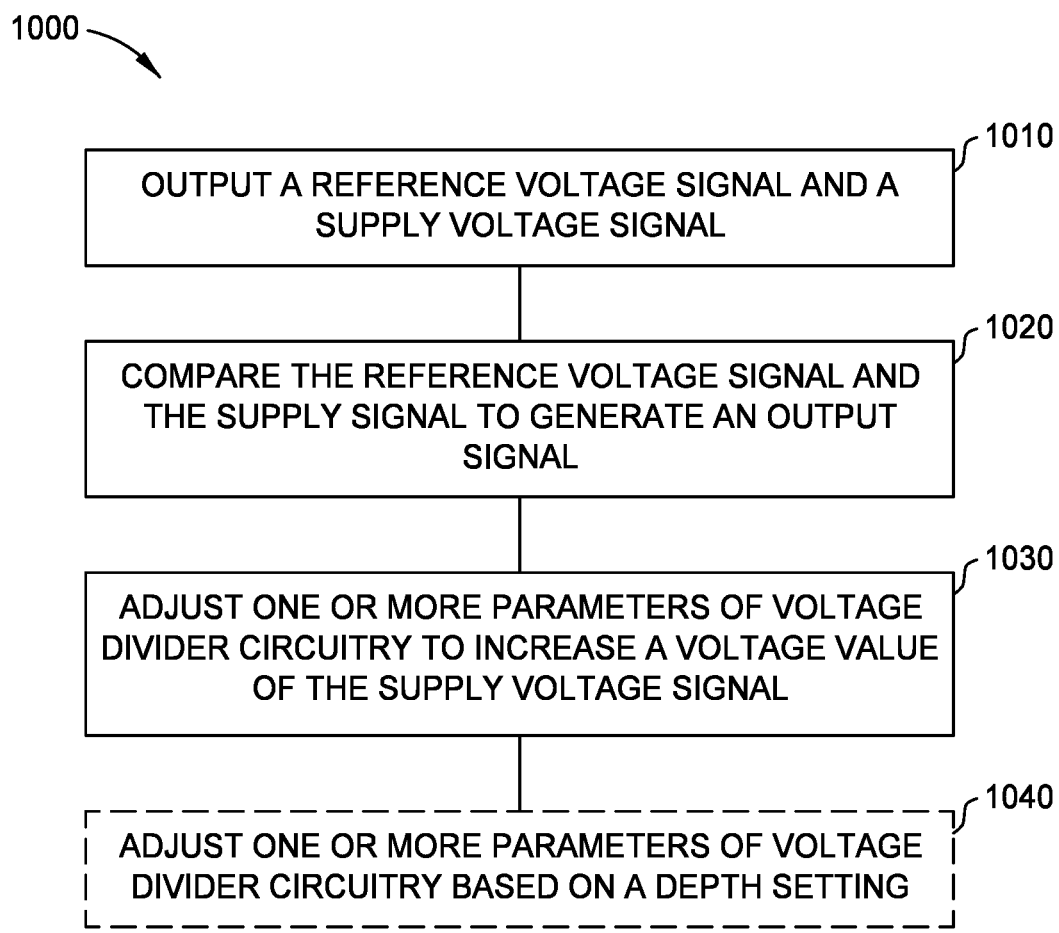
FIG. 10 illustrates a flowchart of a method for calibrating detection circuitry, according to one or more examples.

FIG. 10 is a flowchart of a method 1000 for auto-calibrating glitch detection circuitry, according to one or more examples. The method 1000 may be used to automatically calibrate the glitch detection circuitry 116 of FIG. 1 at power on (e.g., startup), restart, and/or during operation.

At block 1010 of the method 1000, a reference voltage signal and a supply voltage signal are output from voltage divider circuitry. With reference to FIG. 2A or FIG. 2B, the voltage divider circuitry 210 receives the power supply signal 216 and outputs the reference voltage signal 212 and the power supply signal 216 based on the power supply signal 216. In one example, the variable resistance 211 outputs the reference voltage signal 212 based on the power supply signal 216 and the selected tap point 312 of the variable resistance 211. The variable resistance 213 outputs the supply voltage signal 214 based on the power supply signal 216 and the selected tap point 322 of the variable resistance 213. In one example, the selected tap point 322 is adjustable to alter the voltage level of the supply voltage signal 214 and to calibrate the glitch detection circuitry 116.

At block 1020 of the method 1000, the reference voltage signal is compared to the supply voltage signal to generate an output signal. With reference to FIG. 2A or FIG. 2B, the comparator 224 compares the reference voltage signal 212 with the supply voltage signal 214 to generate the comparison signal 225. The comparison signal 225 is delayed by delay logic 226 to generate a delayed signal 227. The comparison signal 225 indicates whether or not the reference voltage signal 212 is greater than the supply voltage signal 214.

At block 1030 of the method 1000, one or more parameters of the voltage divider circuitry is adjusted to increase a voltage value of the supply voltage signal. With reference to FIG. 2A or FIG. 2B, the calibration circuitry 230 or 260 adjusts one or more parameters of the voltage divider circuitry 210 based on the comparison of the reference voltage signal with the supply voltage signal. In one example, the calibration circuitry 230 or 260 adjusts a resistance value of the variable resistance 213 based on the comparison of the reference voltage signal with the supply voltage signal. The calibration circuitry 230 or 260 controls which of the switches 326 are opened or closed, adjusting which tap point 322 is connected to the output 324, to adjust the voltage value of the supply voltage signal 214. The tap point 322 closest to the node of the variable resistance 213 connected to the voltage signal 217 may be selected at power on or reset of the IC 110. In another example, the last selected tap point 322 is selected at power on and/or reset of the IC 110. In one example, the calibration circuitry 230 or 260 controls which of the switches 326 are opened or closed, adjusting which tap point 322 is connected to the output 324 to increase the voltage value of the supply voltage signal 214. The calibration circuitry 230 or 260 may control which of the switches 326 are opened or closed to adjust which tap point 322 is connected to the output 324 to increase the voltage value of the supply voltage signal 214 until the voltage value of the supply voltage signal 214 is greater than the voltage value of the reference voltage signal 212. The calibration circuitry 230 may increase the voltage value of the supply voltage signal 214 until the voltage value of the supply voltage signal 214 is about 5 percent, 10 percent, 15 percent, 20 percent greater than the reference voltage signal 212.

At the block 1040 of the method 1000, one or more parameters of the voltage divider circuitry is adjusted based on a depth setting. The depth setting indicates the percentage difference (e.g., about 5 percent to about 20%) between the reference voltage signal 212 and the supply voltage signal 214. With reference to FIG. 2A or FIG. 2B, the calibration circuitry 230 or 260 adjusts the one or more parameters of the voltage divider circuitry 210 based on the depth setting of the counter circuitry 242. In one example, the calibration circuitry 230 or 260 adjusts the one or more parameters of the voltage divider circuitry 210 based on the depth setting of the counter circuitry 242 after the reference voltage signal 212 and the supply voltage signal are determined to have the same voltage value. The depth setting indicates the number of clock pulses during which the calibration circuitry 230 or 260 continues to adjust the one or more parameters of the voltage divider circuitry 210 after the reference voltage signal 212 and the supply voltage signal are determined to have the same voltage value. In one example, the block 1040 is optional and may be omitted.

As is described above, detection circuitry is used by an electronic system to detect transient glitches in a power supply signal. The detection circuitry compares a supply voltage signal with a reference voltage signal to detect glitches, detecting a glitch when the voltage level of the supply voltage signal is less than that of the reference voltage signal. The detection circuitry includes calibration circuitry that adjusts the supply voltage signal after power up of the corresponding system based on a difference between the supply voltage signal and a reference voltage signal and a depth setting. The depth setting determines a difference between the voltage levels of the supply voltage signal and the reference voltage signal. Further, both the supply voltage signal and the reference voltage signal are generated from a common power supply signal, increasing the versatility of the detection circuitry when dealing with process-voltage-temperature variations.

While the foregoing is directed to specific examples, other and further examples may be devised without departing from the basic scope thereof, and the scope thereof is determined by the claims that follow.

What is claimed is:

1. Detection circuitry for an integrated circuit (IC), the detection circuitry comprising:
    voltage divider circuitry configured to receive a power supply signal and output a first reference voltage signal and a supply voltage signal based on the power supply signal;
    comparison circuitry comprising a first input configured to receive the first reference voltage signal and a second input configured to receive the supply voltage signal, the comparison circuitry configured to compare the first reference voltage signal and the supply voltage signal to generate an output signal; and
    calibration circuitry configured to alter one or more parameters of the voltage divider circuitry to increase a voltage value of the supply voltage signal based on the comparison of the first reference voltage signal with the supply voltage signal.

2. The detection circuitry of claim 1, wherein the voltage divider circuitry comprises:
    a first variable resistance comprising two or more resistors and configured to receive the power supply signal and output the first reference voltage signal based on the power supply signal; and
    a second variable resistance comprising two or more resistors and configured to receive the power supply signal and output the supply voltage signal based on the power supply signal.

3. The detection circuitry of claim 2, wherein the voltage divider circuitry further comprises:
    a capacitor connected between an output node of the first variable resistance and a voltage signal.

4. The detection circuitry of claim 2, wherein the calibration circuitry is configured to adjust a selected tap point along the second variable resistance to increase the voltage value of the supply voltage signal.

5. The detection circuitry of claim 2, wherein the calibration circuitry comprises:
    first counter circuitry configured to output a first control signal;
    control circuitry configured to output a second control signal based on the voltage value of the supply voltage signal being less than a voltage value of the first reference voltage signal; and
    second counter circuitry configured to alter the one or more parameters of the voltage divider circuitry to increase the voltage value of the supply voltage signal based on the first control signal and the second control signal.

6. The detection circuitry of claim 5, wherein the control circuitry comprises:
    first latch circuitry configured to output a third control signal;
    third counter circuitry configured to receive output a fourth control signal based on the third control signal and a first counter value; and
    second latch circuitry configured to output the second control signal based on the fourth control signal.

7. The detection circuitry of claim 6, wherein the first counter circuitry is further configured to alter the one or more parameters of the voltage divider circuitry to increase the voltage value of the supply voltage signal based on the first counter value being greater than a threshold value.

8. The detection circuitry of claim 7, wherein the first counter circuitry is further configured to stop altering the one or more parameters of the voltage divider circuitry to increase the voltage value of the supply voltage signal based on first counter being equal to or less than the threshold value.

9. The detection circuitry of claim 1 further comprising sag detection circuitry configured to:
    receive the first reference voltage signal and a second reference voltage signal from the voltage divider circuitry; and
    output a detection signal based on a comparison of the first reference voltage signal with the second reference voltage signal.

10. An integrated circuit comprising:
    detection circuitry comprising:
        voltage divider circuitry configured to receive a power supply signal and output a first reference voltage signal and a supply voltage signal based on the power supply signal;
        comparison circuitry comprising a first input configured to receive the first reference voltage signal, and a second input configured to receive the supply voltage signal, the comparison circuitry configured to compare the first reference voltage signal and the supply voltage signal to generate an output signal; and
        calibration circuitry configured to alter one or more parameters of the voltage divider circuitry to increase a voltage value of the supply voltage signal based on the comparison of the first reference voltage signal with the supply voltage signal.

11. The integrated circuit of claim 10, wherein the voltage divider circuitry comprises:
- a first variable resistance comprising two or more resistors and configured to receive the power supply signal and output the first reference voltage signal based on the power supply signal;
- a second variable resistance comprising two or more resistors and configured to receive the power supply signal and output the supply voltage signal based on the power supply signal; and
- a capacitor connected between to an output node of the first variable resistance.

12. The integrated circuit of claim 11, wherein the calibration circuitry is configured to adjust a selected tap point along the second variable resistance to increase the voltage value of the supply voltage signal.

13. The integrated circuit of claim 11, wherein the calibration circuitry comprises:
- first counter circuitry configured to output a first control signal;
- control circuitry configured to output a second control signal based on the voltage value of the supply voltage signal being less than a voltage value of the first reference voltage signal; and
- second counter circuitry configured to alter the one or more parameters of the voltage divider circuitry to increase the voltage value of the supply voltage signal based on the first control signal and the second control signal.

14. The integrated circuit of claim 13, wherein the control circuitry comprises:
- first latch circuitry configured to output a third control signal;
- third counter circuitry configured to receive output a fourth control signal based on the third control signal and a first counter value; and
- second latch circuitry configured to output the second control signal based on the fourth control signal.

15. The integrated circuit of claim 14, wherein the first counter circuitry is further configured to:
- alter the one or more parameters of the voltage divider circuitry to increase the voltage value of the supply voltage signal based on the first counter value being greater than a threshold value; and
- stop altering the one or more parameters of the voltage divider circuitry to increase the voltage value of the supply voltage signal based on first counter being equal to or less than the threshold value.

16. The integrated circuit of claim 10 further comprising sag detection circuitry configured to:
- receive the first reference voltage signal and a second reference voltage signal from the voltage divider circuitry; and
- output a sag indication signal based on a comparison of the first reference voltage signal with the second reference voltage signal.

17. A method for detecting a transient glitch within a voltage signal comprises:
- generating, via voltage divider circuitry, a first reference voltage signal and a supply voltage signal based on a power supply signal;
- comparing, with comparison circuitry, the first reference voltage signal and the supply voltage signal to generate an output signal, wherein the first reference voltage signal is received at a first input of the comparison circuitry, and the supply voltage signal is received at a second input of the comparison circuitry; and
- altering, with calibration circuitry, one or more parameters of the voltage divider circuitry to increase a voltage value of the supply voltage signal based on the comparison of the first reference voltage signal with the supply voltage signal.

18. The method of claim 17, wherein adjusting the one or more parameters of the voltage divider circuitry comprises adjusting a selected tap point of a plurality of tap points along a variable resistance of the voltage divider circuitry.

19. The method of claim 17 further comprising:
- alter the one or more parameters of the voltage divider circuitry to increase the voltage value of the supply voltage signal based on a voltage level of the first reference voltage signal being greater a voltage level of the supply voltage signal; and
- stop altering the one or more parameters of the voltage divider circuitry to increase the voltage value of the supply voltage signal based on the voltage level of the first reference voltage signal being equal to or less than the voltage level of the supply voltage signal.

20. The method of claim 17 further comprising:
- comparing the first reference voltage signal and a second reference voltage signal, wherein the first reference voltage signal and the second reference voltage signal are generated from a first variable resistance of the voltage divider circuitry; and
- outputting a sag indication signal based on a comparison of the first reference voltage signal with the second reference voltage signal.

* * * * *